(12) United States Patent
Corneil et al.

(10) Patent No.: US 12,494,294 B2
(45) Date of Patent: Dec. 9, 2025

(54) METHOD AND SYSTEM FOR IDENTIFYING BIOLOGICAL ENTITIES FOR DRUG DISCOVERY

(71) Applicant: BenevolentAI Technology Limited, London (GB)

(72) Inventors: Dane Sterling Corneil, London (GB); Maciej Ludwick Wiatrak, London (GB); Angus Richard Greville Brayne, London (GB); Vinay Prashanth Subbiah, London (GB)

(73) Assignee: BenevolentAI Technology Limited, London (GB)

( * ) Notice: Subject to any disclaimer, the term of this patent is extended or adjusted under 35 U.S.C. 154(b) by 21 days.

(21) Appl. No.: 18/710,948

(22) PCT Filed: Nov. 14, 2022

(86) PCT No.: PCT/GB2022/052881
§ 371 (c)(1),
(2) Date: May 16, 2024

(87) PCT Pub. No.: WO2023/089304
PCT Pub. Date: May 25, 2023

(65) Prior Publication Data
US 2025/0022615 A1    Jan. 16, 2025

Related U.S. Application Data

(60) Provisional application No. 63/370,574, filed on Aug. 5, 2022, provisional application No. 63/279,720, filed on Nov. 16, 2021.

(51) Int. Cl.
*G16H 50/70*    (2018.01)
*G16B 15/30*    (2019.01)
(Continued)

(52) U.S. Cl.
CPC .............. *G16H 50/70* (2018.01); *G16B 15/30* (2019.02); *G16B 40/20* (2019.02); *G16H 70/40* (2018.01)

(58) Field of Classification Search
CPC ........ G16H 50/70; G16H 70/40; G16B 15/30; G16B 40/20; G06F 40/279; G06F 40/295; G06N 3/045; G06N 3/042
See application file for complete search history.

(56) References Cited

U.S. PATENT DOCUMENTS

2021/0248268 A1\* 8/2021 Ardhanari ............... G06F 21/53
2021/0312628 A1\* 10/2021 Larlus-Larrondo .... G06N 3/084
(Continued)

OTHER PUBLICATIONS

Pergola et al., Boosting Low-Resource Biomedical QA via Entity-Aware Masking Strategies, Feb. 16, 2021 (Year: 2021).\*
(Continued)

*Primary Examiner* — Chinyere Mpamugo
(74) *Attorney, Agent, or Firm* — Smith Baluch LLP

(57) ABSTRACT

A computer-implemented method of training a machine learning model to identify biological entities for drug discovery is disclosed. The method comprises providing a training data set comprising a plurality of entity-linked text sequences, each text sequence including a mention of a biological entity, where the biological entity is linked to a corresponding biological entity identifier from a set of possible biological entity identifiers; masking the mention of the biological entity within each text sequence; encoding each masked text sequence into an input representation for a machine learning model; and training a machine learning model to predict the unique entity identifier of the masked biological entity based on the input representation. The described method is able to utilise the full breadth of the rich contextual information available in the biomedical text corpus to predict new biological targets for drug discovery (Continued)

and avoids the restrictions intrinsic to relationship prediction using knowledge graphs. The ability to identify more promising, biologically relevant targets in an automated manner, significantly reduces the requirement of human input and reduces the failure rate in targets that are progressed in the drug delivery pipeline.

19 Claims, 12 Drawing Sheets

(51) Int. Cl.
*G16B 40/20* (2019.01)
*G16H 70/40* (2018.01)

(56) References Cited

U.S. PATENT DOCUMENTS

| | | | | |
|---|---|---|---|---|
| 2022/0165430 | A1* | 5/2022 | Limsopatham | G06F 40/295 |
| 2023/0135659 | A1* | 5/2023 | Wu | G06N 3/044 |
| | | | | 706/21 |
| 2024/0054295 | A1* | 2/2024 | Nishida | G06N 3/0455 |

OTHER PUBLICATIONS

Lee et al., BioBERT: a pre-trained biomedical language representation model for biomedical text mining, Sep. 10, 2019 (Year: 2019).*

Zhang et al., Conceptualized Representation Learning for Chinese Biomedical Text Mining, Aug. 25, 2020 (Year: 2020).*

International Search Report and Written Opinion in International App. No. PCT/GB2022/052881 mailed Feb. 3, 2023, 12 pages.

Logan et al: "Barack's Wife Hillary: Using Knowledge-Graphs for Fact-Aware Language Modeling", arxiv.org, Cornell University Library, 201 Olin Library Cornell University Ithaca, NY 14853, Jun. 17, 2019 (Jun. 17, 2019), XP081382690, the whole document, 10 pages.

Pergola et al: "Boosting Low-Resource Biomedical QA via Entity-Aware Masking Strategies", arxiv.org, Cornell University Library, 201 Olin Library Cornell University Ithaca, NY 14853, Feb. 16, 2021 (Feb. 16, 2021), XP081886961, the whole document, 9 pages.

Zaikis et al: "TP-DDI: Transformer-based pipeline for the extraction of Drug-Drug Interactions", Artificial Intelligence in Medicine, Elsevier, NL, vol. 119, Aug. 23, 2021 (Aug. 23, 2021), XP086778039, ISSN: 0933-3657, DOI: 10.1016/J.ARTMED.2021.102153 [retrieved on Aug. 23, 2021] the whole document, 9 pages.

Zhang et al: "Conceptualized Representation Learning for Chinese Biomedical Text Mining" In: "WSDM '20", Aug. 25, 2020 (Aug. 25, 2020), ACM, XP093017672, vol. 20 Retrieved from the Internet: URL:https://arxiv.org/pdf/2008.10813.pdf> the whole document, 4 pages.

Zhang et al: "SMedBERT: A Knowledge-Enhanced Pre-trained Language Model with Structured Semantics for Medical Text Mining", arxiv.org, Cornell University Library, 201 Olin Library Cornell University Ithaca, NY 14853, Aug. 20, 2021 (Aug. 20, 2021), XP091036829, the whole document, 13 pages.

* cited by examiner

Fig 1

TRAINING CMEs:
(1) This approach has allowed us to demonstrate for the first time that [TGT1_ENTITY] is a key regulatory protein for proper aggregation and fusion of late endocytic structures in the perinuclear region and consequently for the biogenesis and maintenance of the lysosomal compartment.
(2) This study indicated that both JAK1 and [TGT1_ENTITY] were found in the brain tissue of the rats in the sham group, and further expression was available after ischemical reperfusion injury.
(3) Since [TGT1_ENTITY] is significantly and variably upregulated in myocytes following exercise (Gupta et al. 2013), and has been associated with transport of immune cells across the BBB (Chaudhuri et al. 2009), we sought to investigate whether [TGT1_ENTITY] expression was altered...

This approach has allowed us to demonstrate for the first time that [???] is a key regulatory protein for proper aggregation and fusion...

- 120 Training CMEs
- 121, 122 (training examples)
- 123 Query text
- 124 Query Encoder (111)
- 112 Answer Encoder
- 113 Decoder
- 114 Query-answer probability (Maximize)
- TGT1_ENTITY (122)
- 100

Fig 2

BIOLOGICAL QUESTION: Is it possible to find targets that improve neuronal health by boosting lysosomal function in lysosomal storage diseases (plus the disease models of neuronal cerebral lipofuscinosis, CLN3) by stimulating lysosome biogenesis in cortical neurons, as indicated by decreasing substrate accumulation, or by regulating autophagy, as measured by a change in pH in U2OS cells?

MODEL TRANSLATION: [???] is a promising therapeutic target to improve neuronal health by boosting lysosomal function in lysosomal storage diseases with the disease model of neuronal cerebral lipofuscinosis, CLN3 by stimulating lysosome biogenesis in cortical neurons, as indicated by decreasing substrate accumulation, or by regulating autophagy, as measured by a change in pH in U2OS cells.

[???] is a promising therapeutic target to improve neuronal health by boosting lysosomal function in lysosomal storage diseases.

- 221 Biological question
- 222 Model translation
- 223 Inference
- 211 Query Encoder
- 212 Passage Encoder
- 213 Encoder
- 214 Query-answer probability (Use to determine ranking)
- 224 TGT2_ENTITY
- 200

301

305

Enterprise

Generate target predictions and evidence using a query sentence.

811

[x] is a promising therapeutic target for atopic dermatitis.

The sentence should contain at least one instance of [x], which denotes the GeneDomain target. The model will score targets according to how suitable they are to replace [x].

Search

| Rank | Symbol | Relevance Score | Popularity | Corrected Score | Evidence |
|---|---|---|---|---|---|
| 117 | HAVCR1 | 88.4 | 80 | 8.4 | |
| 118 | PLG2 | 88.3 | 45.8 | 22.5 | |
| 119 | CD300LF | 88.2 | 50.7 | 17.6 | |
| 120 | ICOS | 88.1 | 80.3 | 7.8 | |
| 121 | TXK | 88.1 | 51.5 | 18.6 | |
| 122 | NTRK1 | 88.1 | 67.2 | 0.9 | |
| 123 | SH4F1 | 87.9 | 83 | 5 | |
| 124 | IL2 | 87.8 | 77.2 | -9.4 | |
| 125 | CYSLTR2 | 87.8 | 60.8 | 17.2 | |

812

Showing 101 to 125 of 19653 rows — rows per page

Search

| Rank | Score | Year | Evidence Text | Link |
|---|---|---|---|---|
| 1 | 0.805 | 2015 | The staining score of TrkA was significantly higher (P<0.01) in skin from atopic dermatitis patients than in skin from healthy individuals (Fig. 1B). | [1] |
| 2 | 0.795 | 2015 | In addition, application of TrkA inhibitor significantly improved dermatitis and scratching behavior in the NC/Nga mouse atopic dermatitis model, suggesting the importance of TrkA in atopic dermatitis in mice (29). | [1] |
| 3 | 0.79 | - | These results demonstrate the effectiveness of Trk inhibition in reducing the signs, symptoms, histologic presentation and cytokine up-regulation associated with atopic dermatitis. | [2] |
| 4 | 0.779 | 2015 | Expression of TrkA is enhanced in the epidermis in atopic dermatitis. | [1] |
| 5 | 0.757 | 2015 | In addition, TrkA was strongly expressed in keratinocytes in all layers of atopic dermatitis skin. | [1] |
| 6 | 0.724 | 2015 | We first investigated the expression of TrkA in the inflammatory skin diseases atopic dermatitis, prurigo nodularis, and psoriasis vulgaris. | [1] |
| 7 | 0.708 | - | As follow-up, a topical compound screen using the fluorescein isothiocyanate (FITC)-induced contact hypersensitivity model was used to further understand the effects of Trk inhibition on cytokine expression typically associated with allergic skin disease. | [2] |

813

Showing 1 to 25 of 100 rows — rows per page

METHOD AND SYSTEM FOR IDENTIFYING BIOLOGICAL ENTITIES FOR DRUG DISCOVERY

CROSS-REFERENCE TO RELATED APPLICATIONS

This application is a national-phase application, under 35 U.S.C. 371, of International Application No. PCT/GB2022/052881, filed Nov. 14, 2022, which in turn claims the priority benefit of U.S. Provisional Application Nos. 63/279,720 filed Nov. 16, 2021, and 63/370,574 filed Aug. 5, 2022. Each of these applications is incorporated herein by reference in its entirety for all purposes.

FIELD OF THE INVENTION

The present application relates to computer implemented techniques for training a machine learning model to predict relevant biological entities, particularly biological targets, relevant to a user-specified biological context. The application also describes methods of applying the trained model to identify biological entities for use in drug discovery.

BACKGROUND

The first stage of the drug discovery process is to identify suitable biological targets that play a role in a disease of interest, where this role has the potential to be modulated by a therapeutic. The term "biological target" encompasses any biological entity that interacts with, and the activity of which is modulated by, a particular therapeutic, such as genes, nucleic acid sequences, proteins, amino acid sequences, protein complexes, or biological pathways for the treatment of diseases.

In order to identify biological targets that are suitable from among a large number of potential candidates, an assessment of their characteristics against a set of desired criteria must be carried out. Depending on the context and the purpose for which a biological target is required, the desired characteristics may span multiple categories such as ligandability, safety, and therapeutic evidence which must all be taken into account, and as a result the search is required to consider multiple properties of the candidates at once. In traditional approaches, this complex analysis is carried out manually by a scientist reviewing data relating to potential biological targets and sifting the candidates for potential matches to the desired characteristics. In cases involving multiple categories and large numbers of potential biological targets, such manual analysis is time consuming and tends to create delays and increased costs of the process of developing new treatments for diseases. The challenge of discovering and validating targets is reflected in the failure rate of drug candidates in the clinic, where promising treatments fail to show efficacy even in relatively late-stage trials.

The drive to find higher quality potential drug targets for validation has driven the increasing use of bioinformatics and machine learning techniques to analyse the vast and varied biomedical data sources to improve the accuracy of biologically relevant target predictions and reduce the impact of human error and bias.

One approach involves extracting data from these data sources to knowledge graphs, which combine various biomedical entities in one network, connected by associated relationships. Large-scale knowledge graphs (KGs) have gained prominence over the past several decades as a means for representing complex structured data at-scale, leading to the development of machine learning models designed to predict new or unknown information from a KG (Ji et al., 2021). A subclass of these models deals with link prediction, i.e. inferring new facts from a given KG consisting of (subject, relation, object) facts (or triples). For instance, a link prediction algorithm might reason from a KG containing the triple (USA, ElectedPresident, JFK) to infer that the triple (JFK, BornInCountry, USA) also likely exists (i.e. JFK was born in the country USA).

In the biomedical domain, entities represented in a knowledge graph can be, for example, molecules, biological functions and diseases or phenotypes. Relationships include molecular interactions, gene-functional associations, and drug-target interactions. The intrinsic hierarchical structure of many biological entity types makes them particularly well suited to exploring via a knowledge graph. Various computational tools and techniques have been developed to probe biomedical knowledge graphs and extrapolate from them to make predictions of suitable biological targets. These knowledge graph tools are among the best performing target ID techniques currently being deployed.

However, there are significant limitations to these graph-based inference methods. These methods typically comprise two stages: data extraction to the knowledge graph and target prediction from the knowledge graph, both of which are imperfect. Firstly, it is difficult to translate complex, context dependent literature data into relationships in the knowledge graph. Extracting relationships from this rich contextual information in the literature into a compact graph, consisting of highly generalized (but high-confidence) relationships, inevitably results in a loss of information.

Similarly, it is difficult to translate a complex query, defining a specific biological context of interest, into a graph query. Typically, this is done by choosing a query entity in the graph (a disease or a mechanism) that best matches the disease or mechanism under consideration, then querying for targets that best match that query entity. The translation process has several well-known shortcomings such as: (1) there is potentially no good query entity in the graph to match the user's requirements; (2) a lack of alignment between the closest targets and the desired properties of predicted targets; (3) no straightforward way to query on multiple entities at once (e.g. a disease and a mechanism in combination). Due to the simplified representation of links in the graph, higher-order relationships in the text (like the co-occurrence of a target, disease and mechanism in the same paragraph) are not captured.

Accordingly, there is a need for an improved technique for identifying suitable biological targets or other biological entities relevant to a disease of interest, that does not require a user to manually review biological target data, and also improves on the current knowledge graph-based inference methods.

SUMMARY OF INVENTION

In a first aspect of the invention there is provided a computer-implemented method of training a machine learning model to identify biological entities for drug discovery, the method comprising: providing a training data set comprising a plurality of entity-linked text sequences, each text sequence including a mention of a biological entity, where the biological entity is linked to a corresponding biological entity identifier from a set of possible biological entity identifiers; masking the mention of the biological entity within each text sequence; encoding each masked text sequence into an input representation for a machine learning model, and training a machine learning model to predict the unique entity identifier of the masked biological entity based on the input representation.

The present invention departs from the knowledge graph approach by harnessing developments in language models to identify biological targets and other related biological entities by training and predicting directly on free text data. In this way, the claimed method is able to utilise the full breadth of the rich contextual information available in the biomedical text corpus, and avoids the simplifications required in the extraction of data to a knowledge graph. Similarly, since the input into the model is a free text sequence (i.e. a sentence or paragraph), the user has the freedom and flexibility to specifically define an input query, allowing them to specify multiple biological entities and relationships and use specific language to define a specific biological context for which a biological entity is sought, improving the quality of the results. The ability to identify more promising, biologically relevant targets in an automated manner, significantly reduces the requirement of human input and reduces the failure rate in targets that are progressed in the drug delivery pipeline.

The present invention departs from known implementations of language models in other fields as the model is not configured to predict a missing or masked word or token, but instead to predict a unique biological target entity identifier, from a limited set of biological target entity identifiers. In standard question answering with language models, it is typically assumed that a single correct answer exists and so the model is optimised for predicting the correct answer. In the present method, and the context of biological entity prediction, there may be many correct answers and so the model is optimised for performance across the list. In this way, the method is specifically adapted to the task of identifying a biological target as target identification requires prioritising multiple targets for progression through the development pipeline. Since the full set of biological targets can be scored and ranked, this facilitates the subsequent states of the biological target validation process. The use of training on entity linked examples and prediction of an entity ID, also avoids the difficulties associated with disambiguation and converting between predicted words and associated biological targets. Importantly, the present method allows all possible targets (for example the full genome) to be given a unique score for relevance to a user defined query of a required biological context. This is crucial for making novel predictions, i.e. for linking targets to a disease that have never be linked to the disease in the biomedical literature that is used to train the model. This is because, the present method, can provide a score to a particular biological entity, even if it never co-occurs with the specified biological context directly, based on the nuanced contextual information encoded into the representations learned by the language model during training.

Preferably a representation comprises a feature vector, i.e. a vector encoding important distinguishing attributes of the input data. The term embedding is used interchangeably with the term representation. Preferably a representation captures meaningful structure of the input by placing meaningfully similar inputs close together in the representation space. A representation can be learned and reused across models or at different stages of training.

Preferably a biological entity comprises one or more of a disease, gene, protein, compound, chemical, drug, biological pathway, biological process or mechanism, anatomical region or entity, tissue, cell-line, or cell type. In particular, a biological entity may be a biological entity type of a type defined above, where each specific biological entity is associated with a unique biological entity identifier from a limited set of biological entity identifiers. In this way, the model may be trained to predict the biological entity identifier associated with a biological entity that most likely replaces the masked entity in the input text sequence, based on the remaining unmasked portion of the text sequence. Each biological entity type, for example a biological target, disease or mechanism, may have a limited set of biological entities, each with a unique entity identifier. The method involves masking a biological entity of a particular entity type and training the model to score all unique entity identifiers of that particular entity type as to their relevance (likelihood of filling the mask in the input sequence). More specifically the model is configured to output a probability distribution over the set of unique entity identifiers within the masked entity type.

The method preferably involves masking each mention of the biological entity. For example, where the model is trained to predict a biological target, each text sequence may comprise one or more mentions (i.e. occurrences) of a biological target. The method then comprises masking all mentions of the biological target within the input sequence.

Preferably the method involves training a machine learning model to identify biological targets for drug discovery. The term biological target comprises biological molecules, complexes or pathways that may be targeted by a drug for the treatment of a disease. Preferably a biological target comprises a gene or protein. In other examples, the method may be configured to predict, for example, a disease, a biological mechanism, a cell type or a tissue type. In these examples, all occurrences of the selected biological entity in the input sequence are masked prior to encoding as the input representation.

Optionally, the step of providing a training data set comprises: providing an entity-linked biomedical text corpus, where mentions of biological entities within the biomedical text corpus have been linked to a unique entity identifier from a set of possible biological entity identifiers, and selecting text sequences including a mention of an entity-linked biological entity from the entity-linked biomedical text corpus.

Each text sequence preferably comprises one or more sentences comprising a biological context involving a biological entity, preferably a biological target. A biological context may comprise a description involving the biological entity, preferably the biological target. In particular, a "biological context" may be considered a description of the biological entity to be masked and predicted, in relation to one or more additional biological entities. In other words the biological context preferably comprises a sequence of text comprising a mention of a biological entity to be masked and a mention of one or more other biological entities. Preferably the biological context comprises a mention of a biological entity to be masked and predicted, preferably a biological target, and a description of a relationship of the biological entity with one or more additional biological entities. In this way, the model can be trained to predict a masked biological entity from the remaining unmasked biological context of an input query.

Preferably each text sequence comprises a mention of a biological entity of interest and one or more additional biological entities, where biological entities preferably comprise one or more of a biological target, a disease, a biological mechanism, a cell type or a tissue type. Preferably each text sequence comprises a mention of a biological target, and, in some examples, a mention of a disease. Each text sequence preferably includes mention of one or more additional biological entities such as a biological mechanism, a cell type or a tissue type. Each text sequence preferably describes a biological context involving these biological entities, i.e. a statement regarding relationships and/or interactions between the biological entities. Preferably only mentions of a single biological entity are masked, the remainder of the text sequence comprising plain text. In this way, the model is trained to predict the single biological entity based on a representation encoding the remaining plain text of the text sequence.

Preferably the method comprises performing tokenisation on the text sequence to form a sequence of word-piece tokens representing the text sequence, where the masked biological entity is represented by a mask token. In other examples, other quantised representations or token types may be used to represent the text of the input sequence. In this way, the plain text input sequence is converted into a format suitable for processing by the model.

Preferably the machine learning model comprises a language model, where the language model preferably comprises a machine learning model for learning representations of text. The machine learning model preferably comprises an encoder for mapping the input representation to an output representation, where the output representation is a transformed representation of the input representation. Preferably the encoder comprises a plurality of layers and the output representation is formed in the final layer of the model. Preferably the model additionally comprises a classifier layer that receives the output representation and performs classification into classes corresponding to the set of possible biological entity identifiers. In particular, all or part of the output representation may be input to the classifier layer which provides a prediction of which of the set of possible biological entity identifiers corresponding to the biological entity most likely to replace the mask token.

Preferably the encoder comprises a Transformer encoder. For example the BERT encoder. In some examples, the encoders may be pre-trained on a first training data set and then fine-tuning using the training method of the present invention. For example, the encoder may be pretrained during unsupervised learning on a first unlabelled training data set before adding the classifier layer and training on a second training data set comprising the plurality of entity linked text sequences to predict the unique entity identifier of the masked biological target. Training using unsupervised learning preferably comprises training by self-supervised learning where the model is trained to predict a masked or otherwise withheld or corrupted part of the input data. However, pre-training is not necessary given the size of biomedical training corpora available and so preferably the encoder is trained solely on biomedical data, with no pre-training, by the methods described herein.

Preferably training the machine learning model comprises training the encoder and classifier layer together, i.e. simultaneously. In this way, the parameters of both models are adjusted during training, such that the encoder learns representations that improve the prediction accuracy of the classifier layer.

Preferably the machine learning model is trained to output a probability distribution over the set of possible entity identifiers (also referred to as unique entity identifiers). For example, the machine learning model may comprise a classifier layer and softmax configured to provide an output probability distribution over the set of possible entity identifiers.

In some examples, in addition to the mention of a biological entity to be masked, each entity-linked text sequence comprises one or more additional entity-linked biological entities; wherein the method comprises: querying a knowledge graph to extract a subgraph containing one or more of the additional entity-linked biological entities; encoding the masked text sequence and the subgraph together into a combined representation; training a machine learning model to predict the biological entity identifier of the masked biological target based on the combined representation.

This example of the present invention allows for improved target (and other biological entity) prediction by combination of knowledge graph information in addition to trained language models. This method therefore benefits from the advantages associated with knowledge graph inference and language models to further enhance the ability of the model to determine biological entities of interest for a given user-specified biological context. In particular, it still allows for a user to create a query in plain text specifying a particular biological context in an increased level of detail, involving multiple biological entities. However, it also benefits from the structured relationship information present in the knowledge graph by using biological entities entered in the user query to return relevant portions of the knowledge graph. In this example, the combined representation may be input to a classifier layer for outputting a probability distribution over the set of possible biological entities identifiers.

Preferably the biological entity to be masked comprises a biological target and the one or more additional entities comprise one or more of a disease, a predicate, a mechanism, a cell type, a tissue type, a target property.

Preferably the step of encoding the masked text sequence and the subgraph together into the combined representation comprises: encoding the subgraph into a graph embedding (or equivalently defined a "graph representation"); encoding the masked text sequence into the input representation (where the input representation is a text sequence representation, i.e. an input representation for a language model); and combining the graph embedding and the input representation into the combined representation. In this case, the combined representation encodes combined information from the masked text sequence and the subgraph, thereby providing increased information to predict new biological entities and targets associated with a specific biological context. A classifier layer may be trained to predict the masked biological entity based on the combined representation.

Preferably the subgraph comprises the one or more additional entity-linked biological entities of the text sequence. Preferably the subgraph additionally comprises one or more neighbouring entities within the knowledge graph. In particular, the step of querying the knowledge graph may comprises extracting a subgraph that contains each of the additional entity-linked biological entities and one or more connected biological entities and their corresponding relationships (edges). This step may be adjusted to alter the number of neighbouring entities from the knowledge graph included in the subgraph. In one example, the method comprises extracting a subgraph comprising each additional entity-linked biological entity of the text sequence and, for each additional entity-linked biological entity, its one-hop nearest neighbour within the knowledge graph. In some examples the method may comprise, for each additional entity-linked biological entity of the text sequence, selecting related entities from the knowledge graph according to a relevance score, for example selecting entities where the relevance score of the relationship is above a threshold. The relevance score may be normalized Pointwise Mutual Information (nPMI), where nPMI provides a measure of the extent to which two entities tend to co-occur in the same paragraphs of the biomedical corpus.

Preferably, encoding the masked text sequence and the subgraph together into the combined representation comprises: encoding the masked text sequence to form the input representation representing the masked text sequence; encoding the subgraph into a graph embedding; combining the input representation and graph embedding into a combined representation. The method preferably then comprises training a machine learning model to predict the entity identifier of the masked biological entity based on the combined representation. In particular the graph embedding may be a sequence representing the entities of the subgraph. Combining the input representation and the graph embedding into the combined may comprise performing cross-attention on the input representation and the graph embedding to form the combined representation. The input representation may be formed as described above, for example, by performing tokenisation on the masked text sequence.

In examples utilising knowledge graph data, the machine learning model preferably comprises a language model for processing the input representation and a graph model, for example a graph neural network, for receiving the graph embedding. The method preferably comprises inputting the input representation representing the masked text sequence into a language model; inputting the graph embedding representing the subgraph into a graph neural network; performing cross-attention between the language model and the graph neural network to form the combined representation. In this way, a combined representation is formed, combining information from the trained language model and from the knowledge graph, improving the ability of the model to predict new relationships and output more relevant rankings of biological entities. The model preferably comprises a classifier layer that receives the combined representation and performs classification into classes corresponding to the set of possible unique biological entity identifiers. In particular the classifier layer is preferably trained to output a probability distribution over the set of possible biological entity identifiers based on the combined representation. The method preferably comprises: inputting the input representation into a language model; inputting the graph embedding into a graph neural network; performing cross-attention between the language model and graph neural network to output a combined representation; inputting the combined representation into a classifier layer that receives the combined representation and performs classification into classes corresponding to the set of possible unique biological entity identifiers.

In some examples, providing a training data set comprises generating a text sequence using a non-text data source. The non-text data source may comprise patient data, for example omics, genetics or sequencing data. For example, the method may comprise generating a text sequence describing an experimental result. The non-text data source may comprise knowledge graph data. The method may comprise generating a text sequence describing a relationship between two biological entities within a knowledge graph. The method may comprise converting a triple, such as a (subject, verb, object) triple to a text sequence. The method may comprise training the machine learning model using text sequences extracted from a biomedical text corpus and text sequences generated from a non-text data source.

In a further aspect of the invention there is provided a computer-implemented method of identifying biological entities for drug discovery using a trained machine learning model, the method comprising: receiving a user query defining a biological context for which a biological entity is to be determined; obtaining, based on the query, a natural language text sequence describing the biological context, including mention of a biological entity, in which the biological entity itself is masked for prediction by the machine learning model; encoding the text sequence into an input representation for a machine learning model; inputting the input representation into a trained machine learning model, together with a set of biological entity identifiers, each associated with a candidate biological entity; where the machine learning model is trained to predict, for each of the set of unique entity identifiers, a probability that the associated biological entity completes the text sequence by replacing the masked biological entity; outputting one or more biological entities from the set of candidate biological entities based on their predicted probabilities.

In this way, a user may identify one or more biological entities that meet the requirements of the biological context defined in their query. The use of language modelling allows for the model to be trained on huge biomedical corpora to learn subtle contextual information relating different biological entities, and therefore predict new relationships, where these had not been foreseen by any individual author of a portion of the biomedical corpus. Using a language model configured in this way, also allows the input query to be constructed with a high degree of specificity, giving the user the freedom to define the exact requirements that a desired biological entity, such as a drug target, requires. This makes significant progress over relationship prediction using a knowledge graph, where firstly information is lost when forming the knowledge graph but also a user is limited in the complexity of a query, this generally being restricted to querying a particular entity for a required single relationship. The inventors have additionally found that using entity-linked training data and predicting the unique identifier of a biological entity, from the set of possible entity identifiers for that particular entity type provides significant performance advantages for biological entity prediction, where biomedical data is regularly categorised into given ontologies which means this method can be readily applied in this context. In particular, the prediction of entity identifiers, allows for a full set of biological entities to be scored for biological relevance, providing increased signal, allowing this to be used in the drug discovery pipeline.

The set of unique entity identifiers preferably corresponding to all or a sub selection of all possible biological entities of that biological entity type. For example, where the method is used to identify a biological target, a set of unique entity identifiers, corresponding to all possible biological target entities within the biological target entity type are provided to the model for scoring. "Unique" refers to the fact that each identifier within a set is unique and can be used to refer to a single biological entity. This addresses issues of disambiguation given there may be many different ways to refer to a given biological entity in text form, so the model is trained to predict an entity identifier rather than predict missing text, which would then have to be interpreted to extract an entity.

"Including mention of a biological entity, in which the biological entity itself is masked" means that the text sequence comprises a position at which a mention of a biological entity would sit for the sentence to make logical sense. In other words, the text sequence comprises a blank at the position of the word or words corresponding to the biological entity. In particular the natural language text sequence may be a statement describing a required biological context for a biological entity, where a blank or mask icon replaces the one or more occurrences of the biological entity. This form of input query can thus be used to define required properties of a hypothetical target. This form of input query may be described as a cloze-style query, i.e. a problem of identifying a missing word or words.

Preferably the biological entity to be determined is a biological target and the method comprises obtaining a natural language text sequence describing the biological context, including a mention of a biological target, in which the biological target itself is masked. In this way, the method may be applied to the task of target identification for drug discovery.

The machine model is preferably trained according to a method as described above or in the appended claims. Preferably the method comprises outputting a ranking of a plurality of biological entities based on their predicted probabilities. In some example the output biological entities may be scored according to their relevance and ranked according to their score. The score may be a linear transform on the log probabilities of the target fitting into the sentence to scale it in the range [0,100]. In some examples the score may be adjusted according to a popularity metric. This compensates for any bias in the model to predict entities that occur more frequently in the training corpus. The score may be adjusted based on a popularity metric, where the popularity metric is a measure of the proportion of sentences across the corpus that the target appears in. The popularity metric may be output with the relevance score, where the popularity metric may be the proportion of sentences across the corpus that the target appears in, log-normalized to [0,100].

Preferably the biological context is a statement describing a relationship between a biological entity to be determined (i.e. a masked biological entity) and one or more additional biological entities. Preferably the biological context describes a disease of interest. Preferably the biological context comprises one or more of a biological mechanism, a cell type and a tissue type. The biological context may be considered a statement of biological requirements for the biological entity to be predicted.

The user query may comprise the natural language text sequence describing the biological context. In this way, a user may define the exact text sequence to be processed by the trained model. The method may comprise receiving the user query via a user interface. The user interface may comprise a free text box allowing the user to type the text sequence. The masked mention of a biological entity may be presented by a certain character sequence, for example "[X]". This character sequence may be interpreted as the masked entity and converted to a mask token when performing tokenisation.

In other examples the user query may be processed to obtain the natural language text sequence. For example, the syntax, linguistic context or grammar may be adjusted to obtain the natural language text sequence. For example the user may enter a question ("Are there any promising targets for type-II diabetes?") and this may be converted to a statement ("[X] is a promising target for type-II diabetes"). In this way the user query may be processed to create a natural language text sequence having a style closer to the underlying corpus on which the model was trained.

In some examples, obtaining the natural language text sequence comprises automatically generating the natural language text sequence based on the user query. For example, the user may specify one or more words, such as one or more entities and or relationships and the method may comprise automatically generating a natural language sequence comprising the one or more entities and relationships.

Preferably the user query comprises completion of a plurality of input fields, the plurality of input fields comprising the disease of interest and one or more biological entities or relationships, wherein obtaining a natural language text sequence comprises: generating one or more natural language text sequences based on the completed fields using a template. The template may define one or multiple forms of a natural language text sequence.

In some examples, the obtaining the natural language text sequence comprises generating a plurality of different natural language text sequences, each including a masked biological entities and one or more additional biological entities based on the completed input fields; the method further comprising: encoding each of the text sequences into an input representation for a machine learning model; inputting each input representation into the trained machine learning model to obtain probabilities for a plurality of biological entities for each input representation; outputting a list of biological entities based on their combined probabilities across the plurality of input representations to identify the most promising biological entities across the different text sequences. The text sequence may comprise the same or different combinations of biological entities specified by the user. The method may comprise combining the probabilities from the different text sequences to determine an overall list of ranked biological entities for the user query. Preferably the input fields comprise a disease of interest, a biological mechanism, and, optionally, one or more of: a tissue type, and a cell type.

Preferably the machine learning model is trained using a biomedical text corpus, the method further comprising: for each output biological entity, outputting one or more related sentences from the biomedical text corpus, preferably outputting one or more semantically relevant sentences from the biomedical text corpus. The method may comprise displaying the one or more related sentences with the biological entities on a user interface or display.

The semantically relevant sentences are preferably sentences mentioning the corresponding output biological entity. Preferably the sentences mention one or more additional biological entities included in the user query. The method may comprise determining the similarity between sentences of the training corpus and the user query using a measure of similarity between representations encoding the text of the sentences and user query. Preferably each of the semantically relevant sentences is scored using the cosine similarity between a representation of the input text sequence and a representation of sentences within the biomedical text corpus. Preferably the representations are encoded by the same model, for example the trained model described above.

The method may comprise outputting metadata associated with each semantically relevant sentence, where the metadata comprises a document ID and/or digital object identifier. In this way a user can readily review a portion of the training corpus useful in validating the returned biological entities.

In a further aspect of the invention there is provided a system comprising a processor configured to perform any method described herein. In a further aspect of the invention there is provided a computer program comprising instructions that, when the program is executed by a computer, cause the computer to perform a method as described herein.

The following additional aspects of the disclosure may be combined with the above defined aspects of the disclosure, with any of the above options substituted for the options below.

In a further aspect of the present disclosure there is provided a computer-implemented method of providing a pre-training dataset for link prediction using a language model, further comprising: receiving an entity linked corpus associated with one or more domains; identifying one or more entities of interest from the entity linked corpus in relation to at least one identifier; constructing the pre-training dataset from identified said one or more entities, wherein the pre-training dataset comprises at least one sentence with one or more entities of interest; masking said one or more entities of interest within said at least one sentence to generate the pre-training dataset comprises at least one masked entity and said at least one identifier; and generating the pre-training dataset with masked entities for link prediction using the language model.

Preferably the entity linked corpus is associated with the biomedical domain. In particular, the entity linked corpus may comprise a biomedical text corpus. Preferably the one or more entities of interest comprise biological entities, for example a gene, mechanism, disease, cell type, tissue type or protein. Preferably the method comprises masking a biological entity within the at least one sentence. Preferably the method comprises masking a biological target, for example a target protein or gene within said at least one sentence to generate the pre-training data set. The "at least one identifier" comprises a unique entity identifier, preferably from a set of entity identifiers. More specifically, the at least one identifier is preferably an entity identifier from a set of unique entity identifiers defining every entity within a given biological entity type.

The method may further comprises generating a template representative of at least one hyper-relational fact, wherein the template is generated based on a hyper-relational graph; fine-tuning the template for use as input to the language model; and evaluating the link prediction using the language model in relation to the template. In particular, the template may be based on a plurality of biological entities and/or relationships (and optionally roles or mechanisms) and used to generate said at least one sentence for training the model. The sentence may be formed simply by space separating the entities, relationships and roles. The template may comprise a set of qualifier pairs with a qualifier relation and qualifier values.

Preferably the language model is a machine-learning model configured for link prediction receiving natural language inputs. In particular, the model is configured to predict a biological entity linked to the user query, which is input as natural language.

The method preferably comprises training the language model using the pre-training dataset in order to use the language model to predict an identifier based on a masked entity in the sentence. Preferably the method comprises training the language model to predict a unique entity identifier associated with a biological entity, preferably a biological target, based on the input sentence comprising the masked biological entity.

In the above aspect "pre-training data" may simply be referred to as "training data" or "domain-specific training data" and is distinct from the process of pre-training the language model on general text corpora to form a pre-trained language model.

In a further aspect of the present disclosure there is provided a computer-implemented method of training a machine-learning model for link prediction using a pre-training dataset according to the above aspect and optionally, one of more of the below options, wherein the machine learning model is configured to: encode the pre-training dataset comprises at least one query and answer pair; generate at least one vector representation from the pre-training dataset; update the machine-learning parameters of the model based on said at least one vector representation; and output a trained machine-learning model with the parameters updated in accordance with the pre-training dataset. The query preferably comprises the at least one sentence in which an entity of interest is masked. The answer preferably comprises the entity that is masked in the query, more specifically the identifier (unique entity identifier) associated with the masked entity.

The step of encoding the pre-training data set preferably comprises encoding the query and the answer to generate a representation encoding the query and a representation encoding the answer. The method preferably comprises inputting the representations into the model and training the model to predict the answer based on the query.

In particular, the method preferably comprises encoding each training example of the training data, comprising one or more sentences with one or more masked biological entities, as a vector representation; inputting the vector representation into the machine learning model and training the machine learning model to learn parameters allowing the machine learning model to predict the identifier based on the masked input sentence(s). The method preferably comprises using the machine learning model to predict a relationship between a target gene and or more biological entities associated with the target gene based on a query of the target gene, more specifically a natural language query comprising a masked target gene. Preferably said one or more entities comprise at least one gene, mechanism, disease, protein or other biological entity of interest in relation to a query in natural language.

In a further aspect of the invention there is provided a computer-implemented method of link prediction using a pre-training or training dataset according to any of the aspects or options defined above, the method comprising receiving a query to a machine-learning model for link prediction, wherein the machine-learning model is trained using the pre-trained or training dataset; and applying the machine learning model to the query to generate an answer, wherein the machine learning model is configured to: encode the query to generate a vector representation; and decode the vector representation to generate the answer for the query. In particular the model comprises an encoder trained to generate a vector representation encoding the input query and a decoder trained to output a predicted entity based on the vector representation. More specifically, the method comprises receiving a query comprising a natural language text sequence comprising a masked biological entity, applying the trained machine learning model to the query to predict the masked biological entity, wherein the machine learning model is configured to encode the query into an input representation and decode an output representation to predict the masked biological entity.

The query is preferably posed in a natural language sentence comprises at least one biological entity of interest which has been masked in the query, where the biological entity of interest comprises at least one gene, mechanism, disease or protein. The method preferably comprises providing a score for each entity of the set based on a predicted probability associated with said each entity, wherein the score is indicative of the predicted probability that an entity of the set is an entity of interest (i.e. the masked entity in the input query); and ranking the set of entities based on the score.

BRIEF DESCRIPTION OF DRAWINGS

FIG. 1 illustrates a method of training a machine learning model to identify biological entities according to the present invention;

FIG. 2 illustrates a method of using a trained machine learning model to identify biological entities according to the present invention;

FIG. 8B illustrates a user interface for receiving a user input query and displaying biological entity results and associated according to the present invention;

DETAILED DESCRIPTION

Figure 3A:
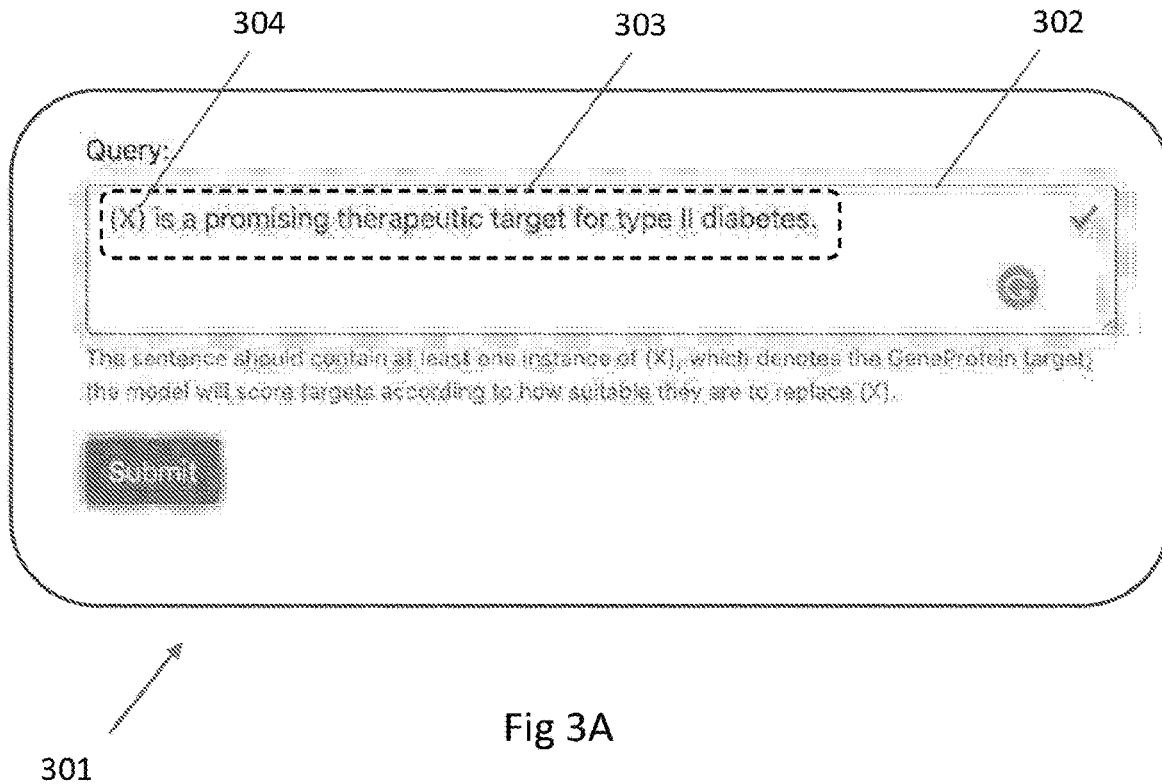
FIGS. 3A and 3B illustrate a user interface for implementing a method of identifying biological entities according to the present invention.

The present invention relates to the application of machine learning techniques to the problem of identifying biological targets for validation and progression through the drug discovery pipeline. Biological targets (also referred to gene/protein targets) encompass any biological component that plays a role in disease processes and may be modulated with a therapeutic compound. The term "biological target" used herein encompasses, for example, genes, nucleic acid sequences, proteins, amino acid sequences, protein complexes, or biological pathways.

More specifically, the present invention applies language models to predicting suitable targets, given a user input query defining a particular disease and associated biological context of interest, based on training of the language model on large biomedical text corpora. This represents the first application of language models to target identification, and allows a number of important advances over prior art knowledge graph inference, including (1) the possibility for a user to craft a full nuanced biological question defining the context required for a particular biological target, rather than the massive simplification to a single disease or mechanism required in knowledge graph inference, and (2) the ability to leverage more complex statistics in the data, like cooccurrences between the gene, disease and mechanism of interest.

Although the present invention builds on recent advances in remote field of language modelling, these have been adapted specifically to the problem of biological entity (and more specifically biological target) prediction. This task involves utilising huge unstructured biomedical text datasets to infer candidate targets given a particular biomedical context. This task involves a number of domain-specific challenges over simply predicting masked words given context, a common application of language models.

The technical challenges include (1) the varying and inconsistent terminology used to refer to biological entities in the literature, (2) the significant word distribution shift from general domain corpora to biomedical literature, (3) the fact that target identification requires identification and ranking of significant numbers of targets for further assessment, rather than simply identifying a best-fit word as in general word slot-filling, (4) the lack of hard negatives in the training data to train the model, given it cannot be certain that other targets, other than the specific mention of a target in a training example, do not play a role in the disease in question, (5) the fact the knowledge base is incomplete and the problem involves extrapolating to predict new unknown targets for a specific disease.

An important contribution of the present invention to address some of these challenges is the fact that the model is trained to predict a unique entity identifier over a complete set of unique entity identifiers. In particular, in the context of gene/target prediction, the model may be configured to output a probability distribution over all possible gene/targets identifiers and can therefore score the entire genome. This provides maximum signal and addresses issues of disambiguation associated with varying and inconsistent terminology, Training the Model for Biological Entity Prediction FIGS. 1 and 2 respectively illustrate a computer implemented method of training and using a model to identify biologically relevant drug targets (referred to herein as "biological targets") according to the present invention. FIG. 1 illustrates a computer-implemented method of training and machine learning model 110 to identify biological targets 122 for drug discovery. The method comprises uses a training data set 120 comprising the plurality of training examples, each comprising an entity linked text sequence 121 including a mention of a biological target where the biological target is linked to a corresponding biological entity identifier from the set of possible biological entity identifiers. The method comprises masking each mention of the biological target within each text sequence 121 to form a masked text sequence 123, each comprising a masked biological target 124. Each masked text sequence 123 is then encoded into an input representation for the machine learning model 110. The machine learning model 110 is trained to predict the unique entity identifier of the masked biological target 124 based on the input representation.

FIG. 1 shows three examples of such entity length text sequences 121 ((1), (2), and (3)) used for training the machine learning model. In this example, each text sequence comprises a sentence describing biological context relating to the target, although the text sequences could be longer or shorter. More specifically each text sequence describes the target in the biological context of a particular disease of interest. In addition to mentioning a target, the sentences may describe the disease of interest and one or more biological mechanisms involving the target, for example their role in regulating a biological process involving a particular cell type. In the example of FIGS. 1 and 2, the disease of interest is lysosomal storage diseases and so each sentence describes a biological target and its role in a biological mechanism relating to lysosomal storage disease.

In each text sequence 121 the biological target 122 is linked to a unique entity identifier. This is a label (for example a number or code) which is specific to that biological target. In this way, different names or abbreviations used to refer to the same biological target (e.g. a particular gene or protein) will be linked to same unique entity identifier, despite being represented by different text characters in the text sequences. There are a fixed, limited number of different entities within a particular entity type, such as a biological target entity type (or gene/protein entity type), such that each unique entity identifier can unambiguously denote a specific entity. Entity linking of the sentences may be carried out by any known method of named entity recognition (NER).

In the example of FIG. 1, the first training example (1) is:
This approach has allowed us to demonstrate for the first time that [TJB1_ENTITY] is a key regulatory protein for proper aggregation and fusion of late endocytic structures in the perinuclear region and consequently for the biogenesis and maintenance of the lysosomal compartment.

Example 1 includes one mention of an entity linked biological target (e.g. a gene/protein), which has been linked to its corresponding unique entity identifier: [TBJ1_ENTITY]. The sentence describes that this protein plays a role in a number of biological mechanisms in a particular biological location ("aggregation and fusion of late endocytic structures in the perinuclear region" and "biogenesis and maintenance of the lysosomal compartment"). In this example of the invention, it is only the biological targets that are entity linked, the remainder of the text sequence comprising plain text. However, as explained below, in other examples a different biological entity type, such as disease, biological mechanism, cell type or tissue type may be entity linked, the remainder of the text sequence comprising plain text. Furthermore, in some example multiple entity types may be entity linked to provide the additional functionality described below.

The training data 120 may be prepared in a number of different ways. In one example the text sequences 121 are prepared from an entity-linked biomedical text corpus, by selecting text sequences (for example sentences, multiple sentences or paragraphs) that mention a biological entity (in this example a biological target entity, such as a gene/protein entity). The entity-linked biomedical text corpus may be prepared using any known named entity recognition technique to identify occurrences of biological entities within the text corpus and link to a unique identifier. As described above, entity-linking ensures that different representations or synonyms referring to the same biological entity are linked to the same unique biological entity identifier. Importantly, as described below, it allows a particular query to be scored over the complete set of possible biological entities, such as the entire, or a certain subset of, the genome.

The text sequences are then prepared by extracting portions of the text, for example single sentences, multiple sentences or paragraphs including any mention of an entity-linked biological target. This process of preparing input text can be automated to prepare a large number of training examples for training the model 110.

As illustrated in FIG. 1, each training example is prepared by masking the mention of the specific entity-linked target, so that training example (1) becomes:
This approach has allowed us to demonstrate for the first time that [MASK] is a key regulatory protein for proper aggregation and fusion of late endocytic structures in the perinuclear region and consequently for the biogenesis and maintenance of the lysosomal compartment where [MASK] represents that the specific biological target is hidden from the encoder of the model. During training, the model is trained to learn a representation of the input masked text sequence that is usable by the trained model to predict the entity (i.e. the unique entity identifier). Alternatively stated, the model is trained to learn a representation that encodes contextual information from the unmasked portion of the text sequence, usable to predict the masked entity. At inference time, these learnt representations can then be used to encode an unseen text sequence (or "user query") in order to predict an unknown biological entity, such as a biological target, that meets the criteria set out in the user query (e.g. a particular biological context).

FIG. 1 illustrates an example that the basic architecture of the machine learning model 110 may take. This exemplary model comprises a query encoder 111, an answer encoder 112 and a decoder 113. As described above, the entity linked text sequences are prepared by masking 124 each mention of a biological target in the text sequence 123. The masked text sequence 123 is input into the machine learning model 110 by encoding it into a suitable input representation for the model 110. The input representation is then input into the query encoder 111 and each of the possible biological targets 122 (more specifically, the unique entity identifiers associated with those targets) are similarly encoded into an input representation and passed to the answer encoder 112. The query encoder 111 comprises a number of network layers through which the input representation, representing the masked text sequence 123, is transformed into an output representation which is fed to the decoder 113.

The decoder 113 receives the transformed representations from the query encoder 111 and answer encoder 112 and outputs a query-answer probability for each of the possible unique entity identifiers 122 input into the answer encoder. The query encoder and decoder and trained together to maximise the query-answer probability of the correct biological entity identifier (i.e. that was present in the original input sequence 121). As training progresses the parameters of the machine learning model are continuously refined such that the query encoder learns to form an output representation which allows it to maximise the probability of the correct query answer pair in each training example.

The query encoder 111 is preferably a language model. In particular, the encoder is preferably based on the Transformer architecture (Vaswani A et al. "Attention is all you need." *Advances in neural information processing systems* 30 (2017)). The model is pretrained using unsupervised or semi-supervised learning on large unlabelled text data sets to learn contextual information to assist in predicting masked words. For example, the pretrained language model may be based on BERT (Devlin J et al. "Bert: Pre-training of deep bidirectional transformers for language understanding."

arXiv:1810.04805 (2018)). More preferably, the query encoder 111 is based on a pre-trained language model which has been trained on biomedical data to improve its performance at recognising biomedical terms and predicting based on biomedical text. An example of a pre-trained language model based on biomedical text data is BioBERT (Lee J, et al. "BioBERT: a pre-trained biomedical language representation model for biomedical text mining." Bioinformatics 36.4 (2020): 1234-1240). Further details of the model architecture are described below with reference to FIG. 5.

In the above examples the machine learning model is trained on a biomedical text corpus, by extracting text sequence including a mention of one or more biomedical entities. In some examples the model may be trained using other data sources by converting data within these data sources to text statements to encode into input representations for training the model. This type of data may be used alternatively to, but preferably in addition to, the biomedical text corpus data described above. Structured data sources can be converted into text for the purpose of training the model. For example patient level data, such as 'omics, genetics and sequencing data may be converted to text data. For example, where a known observation is that TargetX was differentially expressed in the skin of a patient with atopic dermatitis, that structured data can be converted to a sentence: "[MASK] was found to be differentially expressed in the skin of a patient with atopic dermatitis" and given to the model as a training sentence, where it needs to predict the target in [MASK] (in this case, TargetX). Similarly, knowledge graph data may be converted into text data by converting a relationship between two entities in a knowledge graph into a text statement. In this way, non-text data sources can be used as training data for the language model.

Use of the Trained Model for Biological Target Prediction

FIG. 2 schematically illustrates the use of the trained model at inferenced time to predict a biological target based on an input user query. The computer-implemented method of identifying biological targets of drug discovery using a trained machine learning model 210, as illustrated in FIG. 2, comprises firstly receiving a user query 221 which defines a biological context for which a biological target is sought. The user query may be referred to as a "biological question", which species a particular biological context relating to a disease for which a biological target is required. The term "biological context" again is intended to refer to a description of one or more biological processes or mechanisms relating to a disease of interest in which, in the case of prediction, an unknown target plays a role. It can be considered a statement of biological properties or criteria that a biological target is desired to have. In the example of FIG. 2 the biological question of the user query comprises:

Is it possible to find targets that improve neuronal health by boosting lysosomal function in lysosomal storage diseases (with the disease model of neuronal ceroid lipofuscinosis, CLN3) by stimulating lysosome biogenesis in cortical neurons, as indicated by decreasing substrate accumulation, or by regulating autophagy, as measured by a change in pH un U2OS cells?

This biological query specifies a disease of interest (lysosomal storage diseases) and a number of additional parameters relating to the biological context including cell types, tissue type and biological mechanisms. By defining a biological context in this way, using free text, a user is able to specify the exact requirements for the biological target, in an unrestricted degree of precision. This demonstrates an improvement of the present method of using language models over common existing target ID techniques using knowledge graphs, in which only a limited number of biological entities can be defined in an input query. In contrast, here the user to define specifically a disease of interest, one or more biological mechanisms, cell and tissue types associated with the desired biological target. The user may enter the user query using a text input box in the user interface as described below.

After receiving the user query 221, the method comprises obtaining, based on the query 221, a natural language text sequence 222 describing the biological context including a mention of the biological target, in which the biological target itself is masked for prediction by the machine learning model. In the example of FIG. 2 this step involves making minor changes to the input query to define it in terms of a cloze-style statement regarding a biological target in which the mention of the biological target is masked. In particular, in this example, the user query is framed in the form of a question and the natural language text sequence is rephrased slightly in the form of a statement about an unknown target 223. In particular, the input user query is reworded into the following natural language text sequence:

[???] is a promising therapeutic target to improve neuronal health by boosting lysosomal function in lysosomal storage diseases (with the disease model of neuronal ceroid lipofuscinosis, CLN3) by stimulating lysosome biogenesis in cortical neurons, as indicated by decreasing substrate accumulation, or by regulating autophagy, as measured by a change in pH un U2OS cells.

Although not essential, the reframing of the biological question into the input sequence 222 brings the format of the input sequence closer to the training examples, to frame the question as a statement relating to a hypothetical target (where the mention of the target itself is masked). Given the model is preferably trained on the biomedical literature, the training examples will generally take this form of a statement involving the target and a biological context, so framing the input query in this way is likely to improve prediction performance.

However, as will be described below, the user query defining the biological context for a particular biological target can be input in a number of ways, as long as a natural language text sequence can be formed based on the user query. For example, a user may just specify the important biological entities (for example the disease of interest, a biological mechanism, cell type and tissue type) and an initial module of the model may be configured to automatically generate a natural language text sequence, in the style of the training examples, based on the input biological entities. In the present case the use of query defining the biological context is input as free text which is converted into the cloze-style statement for its input to the model.

The input natural language text sequence 222 therefore comprises a statement of a biological context in which the hypothetical biological target is masked 223 for prediction. The natural language text sequence is encoded into an input representation for the machine learning model to 210 and input into the query encoder 211. As described above, the encoder 211 has been trained to transform the input representation to an output representation which is usable by the decoder 213 to predict the biological entity that should replace the mask in the input sequence. Each possible biological entity identifier 224 that could replace the masked target 223 is input into the answer encoder 212 and the trained model 210 computes a predicted probability for each input unique entity identifier 224. Since there are a limited set of possible biological identifiers, the trained model may be configured to output a probability distribution across the set of possible biological entity identifiers.

The inventors of the present method have identified a number of features ensuring that it is specifically adapted for the task of biological entity prediction, more specifically biological target prediction, for use in drug discovery pipelines. In particular, the method departs from known uses of general language models for prediction of missing words. Rather than training the model to predict a word or a multiple word phrase to replace the mask in the input sequence, the model is instead trained to predict the unique entity identifier then associated with the biological target and more specifically to score and rank all possible biological targets by outputting a probability distribution across the complete set of biological target (e.g. gene/protein) identifiers.

There are number of difficulties associated with adapting word and language models for target prediction. In the general domain some of the major successes of information retrieval methods have been in the ability to present the model with hard negatives to teach the model and help the algorithm correct mistakes and improve. In biomedicine, and the tasks of biological entity particularly biological target predictions, it is difficult to provide the model with hard negatives as there may be other valid answers that cannot be validated due to the knowledge base being incomplete. This compromises the ability to build gold standard training data and allow the model to extrapolate to predict unknown biological targets. This leads to noisy training data which can reduce model accuracy. Another issue is the divergence of the terminology used in the biomedical domain compared to the general domain, where a wide range of acronyms and technical terms may be used for the same or similar biological targets, introducing problems of disambiguation if a language model is used to predict missing words.

The present technique addresses these issues to adapt language models for the purpose of target prediction by, instead of predicting masked words, training to predict probability over a complete set of possible biological target identifiers. This firstly addresses issues associated with converting an output series of word pieces or tokens to a corresponding biological target. It also facilitates the process of target validation by providing a relevance score across all biological targets which drug discovery experts can assess in combination with other required factors to make a decision on progressing with biological targets. In contrast, a method of simply providing a single output best fit would not achieve these goals given that biological relevance must be taken into account with a number of other factors, meaning it may not be the top targets for biological relevance that are progressed to validation for drug discovery, and so a list ranked by relevance is required.

Figure 3B:
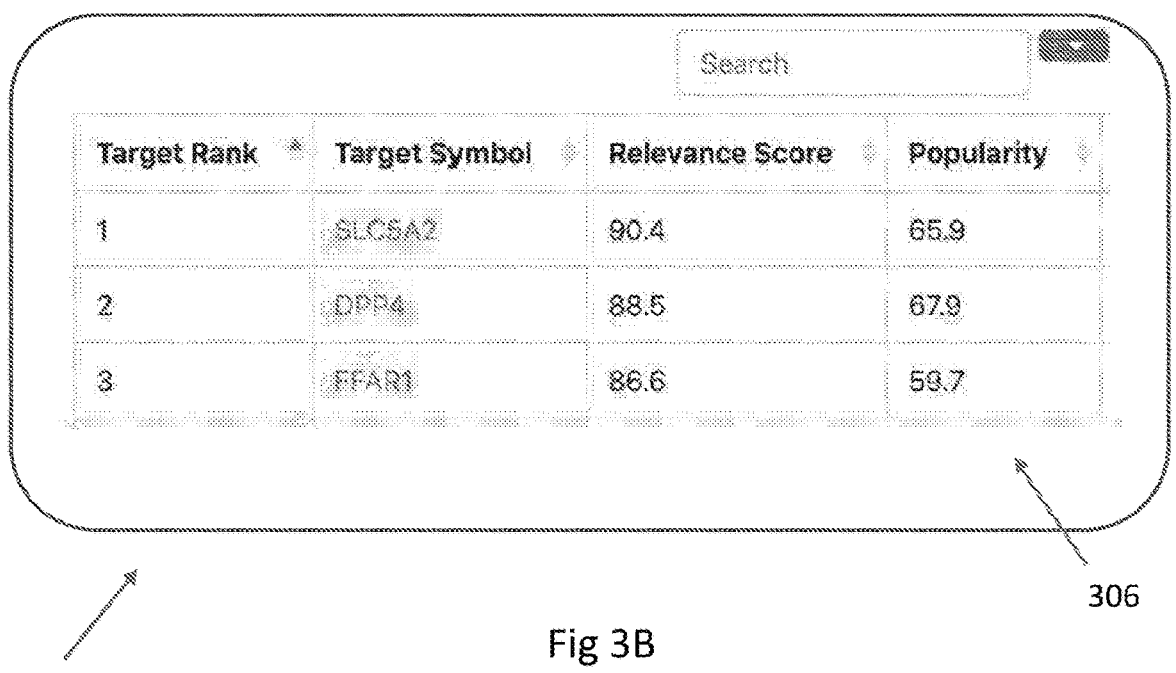

FIGS. 3a and 3b show an exemplary user interface for use of the present invention. FIG. 3a schematically illustrates that user interface 301 for inputting a user query 303 for processing using the method according to the present invention. The user interface comprises a text entry box 302 in which a user can type a free text query for processing by the model. As described above, the user query 303 may comprise a biological context for a particular biological target, for example, specifying a disease and one or more additional aspects of the biological context for example a biological mechanism, cell type of cell tissue of interest. For illustrative purposes the example of FIG. 3a shows a simplified user query in which the user is simply seeking a biological target for type two diabetes.

The user query is input as free text in the form of a statement regarding an unknown biological target in which the position of the biological target in the sentence is replaced by a mask icon 304, in this case input via characters (X). The biological context could of course include a large amount of additional detail defining in the biological context for which the target is sought. The user simply types the query into the text box and submits for processing by the model, as described above. The user query 303 is then converted to an input representation for the model and this process as described above to provide an output list of ranked biological targets (or other biological entities, where a different type of entity is masked).

A user display 305 is illustrated in FIG. 3b which shows an output table of ranked biological targets 306 for the input query as shown in FIG. 3a. the model computes a relevant score for each of the possible biological targets. The relevance score is based on the probability output by the model for that target (i.e. the computer probability of the biological target replacing the mask token). For the purpose of display to the user, the displayed relevance score may be calculated as a linear transform on the log probability of the target filling into the sentence, such that the score is scaled into the range [0,100]. In some examples it may compute the relevance for each biological target (i.e. each gene/protein) across the human genome or a subsection of the genome. Therefore, although the top three ranked biological targets are illustrated in FIG. 3b, the table may include a large number of additional rows showing the relevant score for all targets across every possible biological target. The output table may therefore have a search function as shown for allowing the user to search for targets to identify the computed relevance.

In addition to a computed relevance score for the output by the model, the model may also output a popularity metric indicating the assessment of the number of mentions of the biological targets within the literature. In particular, the final column "popularity" gives a metric indicating how widely mentioned the biological target is across the biomedical corpus used in the training data. In this example the metric represents the proportion of sentences across the training corpus that the target appears in, log-normalised to [0,100] in the same way as the reference score. In this way, the user is able to assess the popularity of a particular target and may take this into account when selecting biological targets to take forward through the drug discovery pipeline. The model according the present invention may also apply a literature bias function to account for the greater number of mentions of certain targets to manage the effect of literature bias, which could promote targets which have a greater number of mentions within the literature above more biologically relevant but less cited targets. The model may apply a function to normalise the relevance score using the function to address the literature bias (for example the popularity metric as calculated above may be used to adjust the relevance score).

Model Architecture

Figure 4:
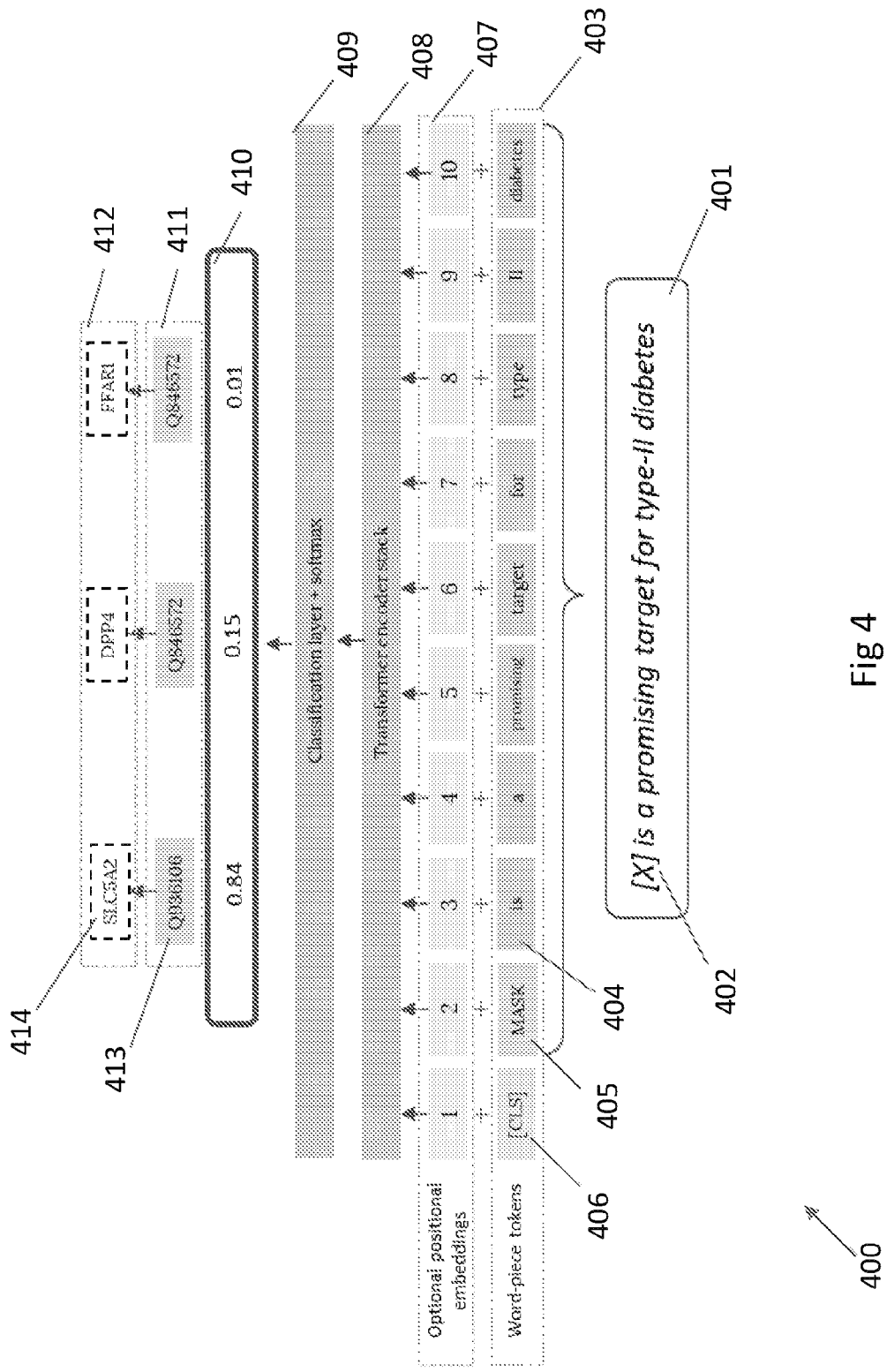
FIG. 4 illustrates an example model architecture used in a method according to the present invention.

FIG. 4 schematically illustrates a more detailed diagram of a possible architecture of the machine learning model 400 according to the present invention. As described above, the input to the model is a text sequence 401 describing a particular biological context including a mention of a biological target 402 which is masked to the model for prediction. In the example of FIG. 4 the input sequence 401 is "[X] is a promising target for type-II diabetes". As described above, the user query may be entered by a user in a text input box in the user interface, where the query is posed in a form of a cloze-style query in which a hypothetical target is mentioned in the statement but replaced by a mask icon, in this case represented by [X].

The first stage is to encode the text sequence 401 into an appropriate input representation for the machine learning model 400. In this case the machine learning model is based on the Transformer architecture (Vaswani A et al. "Attention is all you need." *Advances in neural information processing systems* 30 2017) and comprises a transformer encoder stack 408 which is configured to map the input representation of the text sequence to an output representation which is useable by a classification layer and softmax 409 to predict the unique entity identifiers 411 of the potential biological targets 412. The transformer encoder 408 may be pre-trained and initialised with the pre-trained model weights, which are then further fine-tuned by the training method illustrated in FIG. 4. However, given the present training method may utilise readily available large biomedical training data sets, pre-training is not essential and the inventors have identified that the model actually achieves increased performance by training solely based on the classification training task described herein. The transformer encoder stack 408 may be based on the BERT model architecture (Devlin, Jacob et al. "Bert: Pre-training of deep bidirectional transformers for language understanding." arXiv preprint arXiv:1810.04805 2018), or, more preferably, the BioBERT encoder (Lee, Jinhyuk et al. "BioBERT: a pre-trained biomedical language representation model for biomedical text mining." Bioinformatics 36.4 2020). As described above, these models may be pre-trained using general (i.e. non-biomedical data sets) or they may be trained solely on biomedical data.

During training, sequences of text from an entity linked biomedical training corpus are prepared, where each comprises a mention of a biological target. During training, the mention of the biological target is masked and the masked text sequence input into the model 400. The text sequence is input by encoding the masked text sequence into an input representation. In this example, encoding involves performing tokenisation on the text sequence to encode the text sequence as a sequence of word piece tokens representing the sentence or multiple sentences of detect sequence. Any suitable tokenisation may be performed but in the present example BERT word-piece tokenisation is used to convert text sequence to word-piece tokens 404. The masked biological target 402 in the text sequence 401 is replaced with the mask token 405 in the token sequence 403. As in the BERT architecture, each token sequence starts with the special token [CLS] 406 denoting the start of a text sequence. Optionally, the word-piece tokens may be combined with positional embeddings 407. The positional embeddings encode the position of the corresponding word piece token in the input sequence.

The word piece tokens 403 and the positional embeddings 407 may simply be summed to form the input representation of the input text sequence 401. The input representation of the input sequence 401 is then fed to the transformer encoder stack 408 which maps the input representation through the network layers to a transformed output representation, which is fed to the classification layer 409. The classification layer 409 is trained to output a probability 410 for each of the possible unique biological target identifiers 411, which are each associated with a specific biological target 412. In particular, the dot product between the final MASK embedding and each of the possible biological entities identifiers is computed and passed to a softmax. Preferably, during training the transformer encoder stack 408 and the classification layer 409 are trained together such that the transformer encoder stack 408 learns representations which are useable by the classification layer 409 to predict a probability distribution cross the set of unique biological target identifiers 411.

At prediction time, the user inputs a query (such as text sequence 401) defining a biological context for which a biological target is sought. The query may be posed in free text as a cloze-style statement as shown in FIG. 4 where in this case the user is interested in identifying a target for type-II diabetes. The cloze-style query is formed as a statement regarding defining a biological context involving a hypothetical target, in which mention of the target itself is masked to be replaced with the mask token 405. Clearly the input statement in FIG. 4 represents a simplified version of a user query, which might define significant detail the requirements of the target, identifying a particular biological mechanism or mechanisms, cell types and tissue types.

The same model architecture is used at prediction time using the trained encoder 408 and classification layer 409. As with training, the input text sequence is firstly encoded into an input representation for the model. This is achieved by performing tokenisation to convert the words of the input sequence to word piece tokens 404, where the masked target for prediction is placed with the mask token 405. It should be noted that, even where the target may be multiple words it is simply replaced by the mask token, given that the model is predicting a single unique identity identifier rather than a word or multiple word sequence. As with training, the word piece tokens 403 may be combined with their positional embeddings 407 to form the input representation. The input representation is passed to the trained transformer encoder stack 408 which transforms the input representation to an output representation which is fed to the classification layer and softmax 409 which then provides a probability distribution across the set of possible unique biological target identifiers 411. In the example of FIG. 4, unique identifier "Q936106" associated with biological targets SLC5A2, is identified as the highest probability biological target to fill the masked biological target in the input sequence 401. The representations used by the classification layer to make the predication may be selected in a number of ways. In one example, the final hidden representation corresponding to the mask token 405 is fed to the classification layer and an output softmax 409 to provide the probability distribution over the set of unique entity identifiers 411. In other examples the special token 406 may be fed to the classification layer and used as the basis of the prediction of the probability distributions over the unique entity identifiers 411.

Additional Entity-Linking

In the above-described examples the model has been trained using a biomedical corpus in which only the biological targets are entity-linked to a corresponding unique identity identifier. Although this is the minimum requirement for the model to function for the task of target prediction, in other examples additional entity-linked biological entities may be included in the biomedical training data. In particular, a model may be trained to predict other types of biological entity, in addition or alternatively to a biological target.

Figure 5:
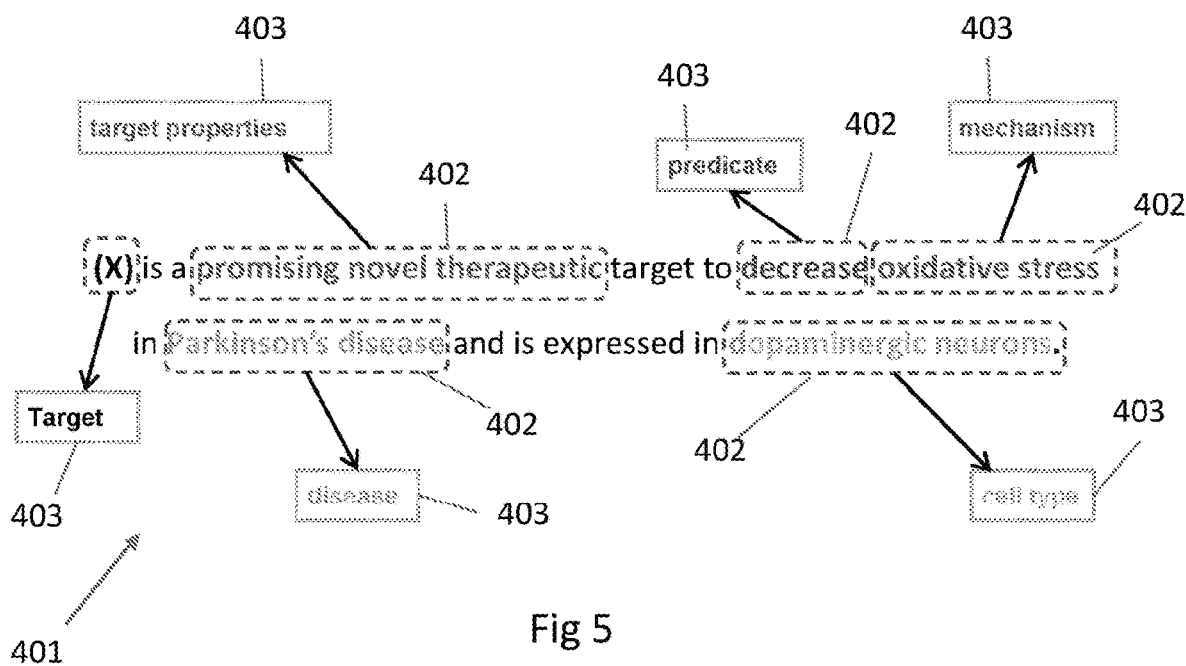
FIG. 5 illustrates an example of a user query comprising a plurality of biological entities used in a method according to the present invention.

FIG. 5 illustrates an example text statement defining a biological context for a particular biological target, namely "(X) is a promising novel therapeutic target to decrease oxidative stress in Parkinson's disease and is expressed in dopaminergic neurons". As described above, this statement could be a training example prepared for training the model, or a user query for prediction, where the statement of biological context 401 includes a masked target 403 and the remainder of queries comprises plain text.

However, rather than only the target 403 being linked to a unique identity identifier in the input sequences used for training, other biological entity types may be entity-linked to their corresponding unique identity. In the example of FIG. 5 there are a number of biological entity types 403, including target property, predicate, mechanism, disease and cell type. Each of these biological entity types 403 may be linked to their corresponding biological entity identifier in the training data. In these examples the model may additionally be trained to predict other types of biological entity. For example, instead of masking the target as shown in FIG. 5, the disease entity "Parkinson disease" may be masked instead and the model trained to predict the unique identity identifier of the disease based on a representation of the masked sentence. In this way, by training the model to predict other types of biological entity types the user may approach the problem of target identification in different ways, for example, by first framing a query to predict a potential biological target and then using the returned biological targets to form further user queries, for example to predict a disease or a mechanism to better understand the biological target and decide on whether to take the target through to progress through the drug discovery pipeline.

Using an entity linked corpus in which additional biological entity types are linked to their unique identity identifiers provides a number of possible extensions to the present method. As well as allowing prediction of non-target entities such as a disease or cell type which can assist the target prediction objective, the model may be adapted to use the additional entity links biological entities to improve target prediction.

Figure 6:
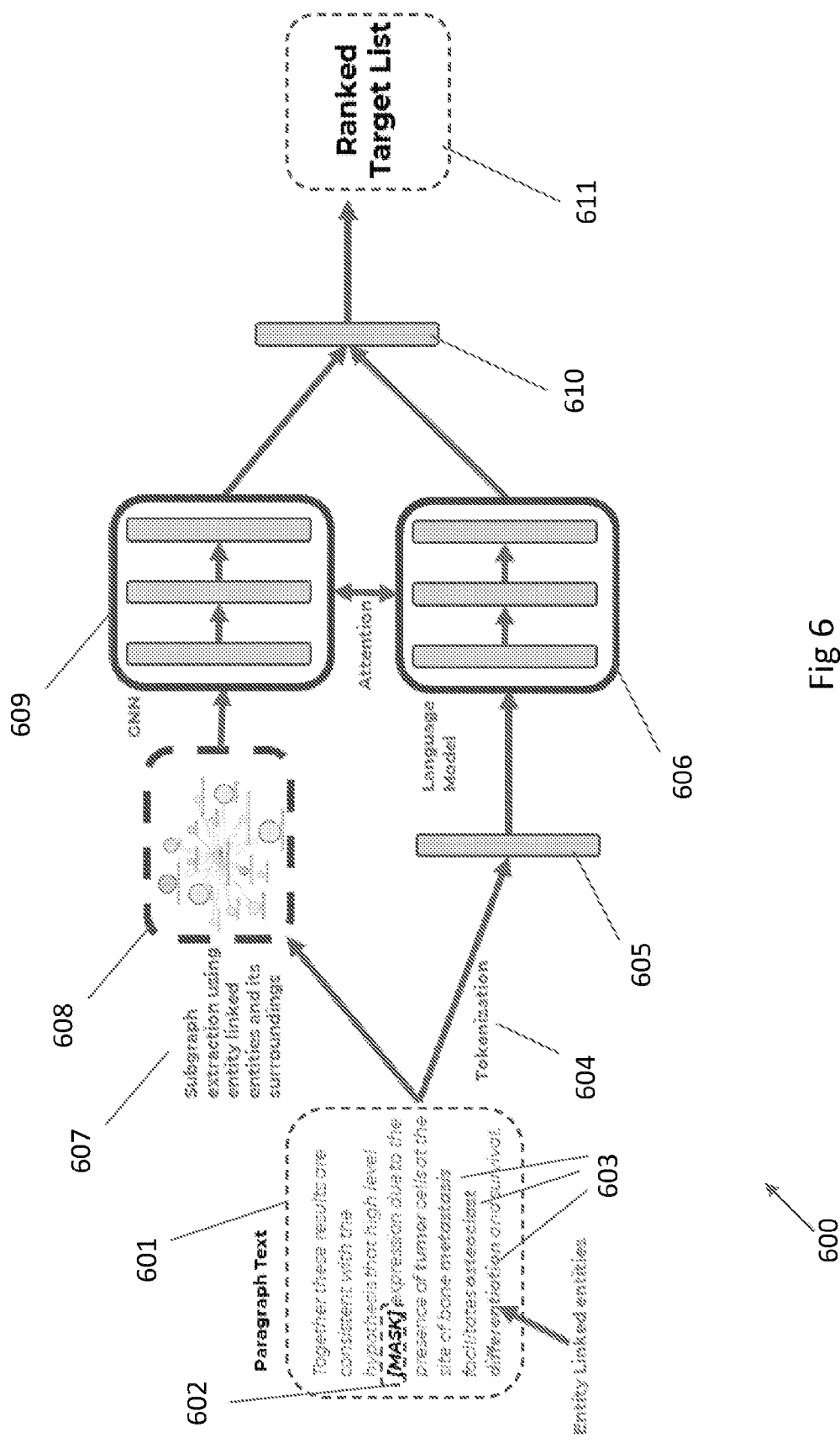
FIG. 6 illustrates a method of identifying biological entities according to the present invention, using a trained language model and information extracted from a knowledge graph.

FIG. 6 illustrates computer implemented method 600 of performing target prediction according to the present invention, which has been extended to utilise additional entity linked biological entities. As with the previously described examples of the invention the input to the model is a text sequence describing a biological context involving a biological target, in which but one or more mentions of the biological target are masked, and the model is trained to predict one or more biological targets to replace the mask. In previous examples described, only the biological targets are entity linked (i.e. all mentions of biological targets have been identified and associated with one of the possible unique biological target identifiers). In the present method, additional entity-linked biological entities 603 are included in the text sequence 601. In the example of FIG. 6 the input text sequence comprises "Together these results are consistent with the hypothesis that high level [MASK] expression due to the presence of tumor cells at the site of bone metastasis facilitates osteoclast differentiation and survival."

The entity linked biological entities are indicated in bold. The method 600 of FIG. 6 involves querying a knowledge graph to extract a sub graph including the entity linked entities from the input sequence in addition to surrounding entities within the knowledge graph. This information from the knowledge graph may be combined in the model to supplement the information and knowledge encoded in the trained language model, to improve target prediction. In this example, the machine learning model comprises both a language model 606, as described above, but also another model able to process knowledge graph data, such as a graph neural network 609 to process the extracted sub graph 608.

The input text sequence 601 is firstly prepared as described above to form an input representation 605 for the language model 606, for example using tokenisation where the masked entity is replaced with a mask token. In addition, the additional entity-linked biological entity 603 are used to query a knowledge graph and extract a sub graph 608. Sub-graph extraction 607 is performed to extract a sub graph 608 including the entity linked entities present in the input text sequence 601. In addition, the sub graph may include one or more neighbouring entity nodes from the knowledge graph. For example, the knowledge graph may be queried to extract the one-hop nearest neighbours of each of the additional entity linked entity 603 in the input text sequence 601. In this way, a sub graph 608 is formed including the entity linked entities in the input sequence in addition to their nearest neighbours within the knowledge graph. More generally, the sub graph extraction is carried out by querying the knowledge graph to prepare a sub graph including the unmasked entities. That is, the sub graph combines the unmasked biological entities in the input text sequence.

The sub graph 608 is then encoded into the representation for the graph neural network 609. The language model and the graph neural network are configured to perform cross-attention, to combine the language model input representation and the sub graph embeddings to output a combined representation 610. The combined representation encodes information from both the sub graph 608 and the input language model representation 605. The output representation 610 is then fed to a final network layer, to provide a rank target list 611, as described previously providing a list of possible biological targets and their associated relevance for probability score. As described above, the output representation 610 may be fed to a classification and softmax layer to output a probability distribution over the set of possible biological target unique identifiers. In this way, the method is able to combine both the advantages of knowledge graph inference and language model inference to make improve predictions of biological targets. As above, this method can be used to predict other types of entities in addition to biological targets. This method provides significant advances by combining different sources of information in a single output representation 610 to use to predict biological targets.

Entity-linked entities may have from a couple to thousands of neighbours in the knowledge graph and, as such, a method of selecting the more relevant relationships and entities, which complement the sentence, must be used. For example, the sub graph extraction may involve just extracting the one hop nearest neighbours of each entity. Alternatively, or additionally a relevance score may be used to prune the neighbourhood in the knowledge graph to remove less relevant relationships. One example of a relevance score that may be used to select relationships and associated biological entities within the knowledge graph for extraction to the subgraph is normalised Pointwise Mutual Information (nPMI). This is a measure of the statistics around how two entities (e.g. a disease and a target) co-occur, for example across paragraphs in the literature corpus or within the Knowledge Graph. If the nPMI is high, the two entities tend to co-occur, for example in the same paragraphs or parts of the knowledge graph, which suggest a correlation. In particular, an nPMI of 1 would mean that neither entity ever occurs (e.g. in a paragraph or part of the knowledge graph) without the other entity occurring in the same paragraph (i.e. perfect correlation), thereby suggesting that they are highly related/linked. Therefore in one example, the most relevant neighbouring entities are selected by selecting entities that have an nPMI over a particular threshold.

The representation in which the sub graph 608 is encoded for input to the graph neural network 609 may take a number of different forms. For example, knowledge graph embeddings may be used (for example using Node2Vec or corpus wide pretrained knowledge graph embeddings). Alternately BERT based embeddings may be used or some combination of the two.

User Query Templates

Figure 7A:
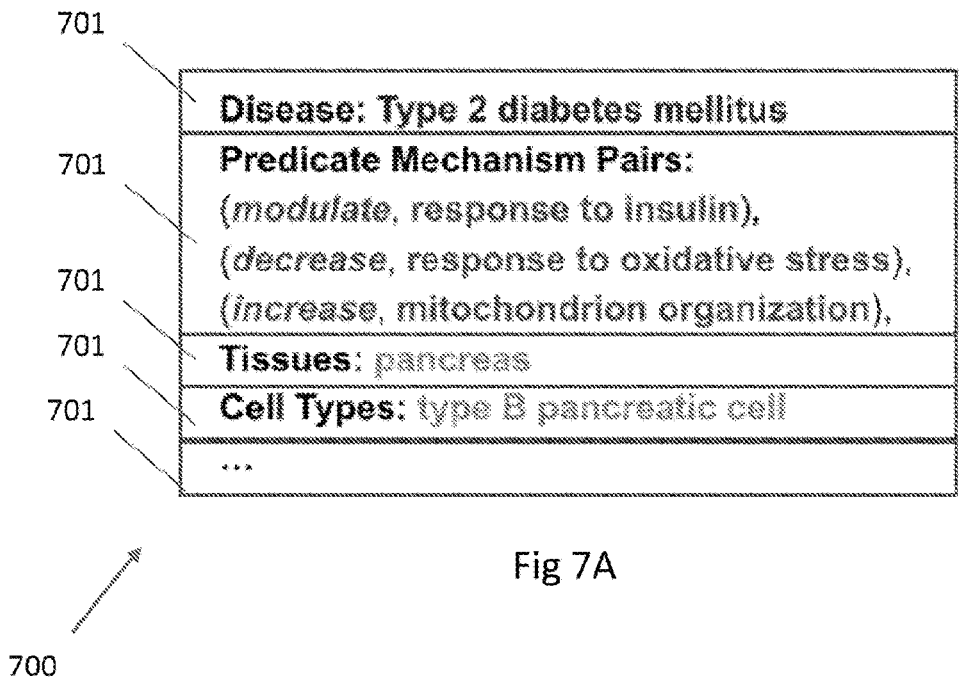
FIGS. 7A and 7B illustrate a method of generating a text query for a machine learning model using tabulated data according to the present invention.
Figure 7B:
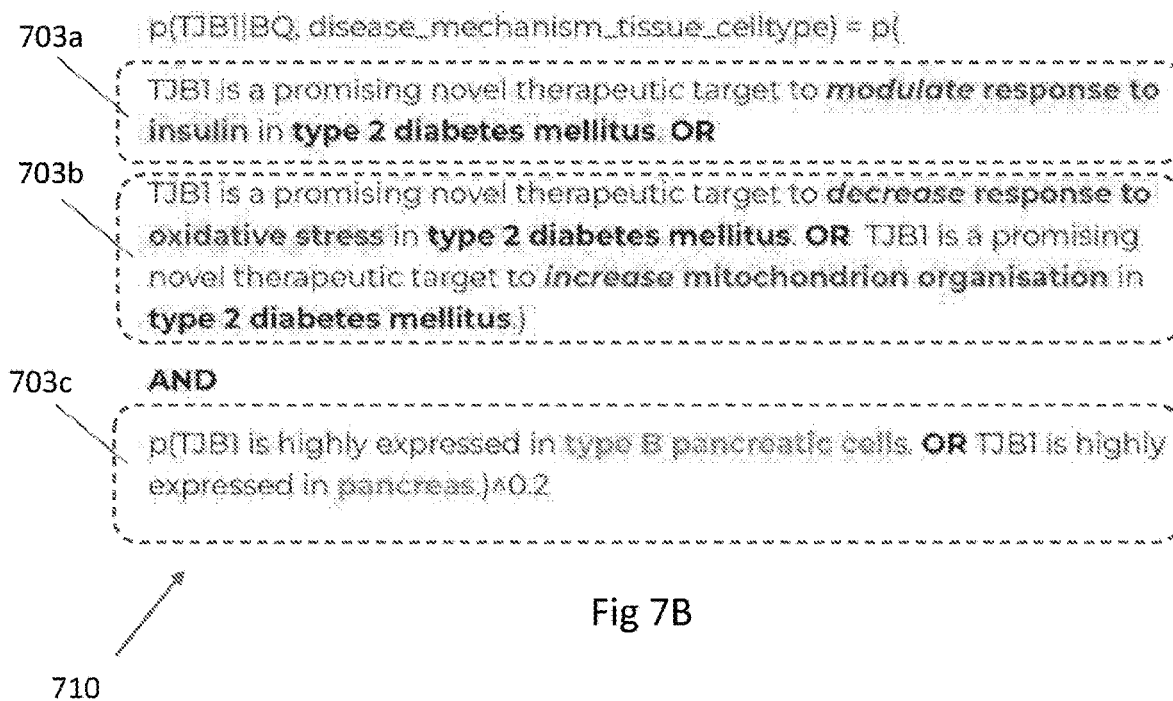

FIGS. 7a and 7b illustrate an extension of the present method relating to the form of the user query which is input into the training model for target prediction. As described above the user query may comprise a plain text statement or question describing the biological context involving the biological target in which mention of the target itself is then masked. As with all machine learning models, prediction performance is enhanced where the form of the input data into the trained model at prediction time is closer to the form of the data on which the model was trained. In this case, where the model is trained on biomedical text corpora, for example PubMed, the user query at prediction time is preferably in the style of a statement as likely to occur in the scientific journals in PubMed. It should be noted that, even if the text query is posed with a different style or form the model is still able to function and accurately predict biological targets, but additional performance enhancements may be achieved by aligning the form of the input query at prediction time with that of the text sequences used during training of the model.

The user may simply achieve this themselves in the form that they enter the text sequence into the user interface. Alternatively, the model may automatically generate one or more input text sequences based on a simplified form of a user input query. FIG. 7a shows an example of the method in which the user query comprises completion of the plurality input fields 701. In particular, the user may enter a disease one or more predicate mechanism pairs, a tissue and a cell type. There could be more or fewer fields or the user may be able to select the number of fields they complete and the text sequences are generated based on just the completed fields 701. In this case, the user is interested in identifying targets for type two diabetes which function according to the biological mechanisms specified and are relevant to type B pancreatic cells in the pancreas. The computer implemented method may comprise generating one or more natural language text sequences 703 as shown in FIG. 7b based on the completed fields 701.

The method may use one or more templates to create natural language text sequences of a style similar to the sentences selected from the biomedical text corpus on which the model is trained. In the example of FIG. 7b the method incudes generating a plurality of different natural language text sequences having different forms based on the input data provided by the user in the query of FIG. 7a. Each of the generated natural language text sequences 703 may be fed to the model as described above, with each encoded in an input representation which is fed to the trained model to provide an output list of ranked biological targets. In some examples the user may specify how they wish the output based on each input text sequence 703 to be combined to provide an overall output list of ranked targets. For example, the combination of computed score or probabilities for the natural language text sequences 703 may be defined by the user, for example with logical operators such as OR and AND to combine the outputs in different ways.

Different types of natural language text sequences may be generated based on the completed fields 701 of the query 700 in FIG. 7a. For example, in the final pair of text sequences 703c only the information in the tissue and cell type fields is used and these fields are used to create two alternatives sequences one using the tissue and one using the cell type, together with a masked target. These are combined with other text sequences focusing on the disease and the biological mechanism in 703a and 703b. In this way a user input query can be used to generate the plurality of different types of input text sequences in which the probability is generated on each may be combined and weighed to provide a desired output. This presents a more efficient, user-friendly method in which the user need only identify particular biological entities of interest, and the required input text sequences are generated automatically for input into the model.

Evidence Surfacing

Figure 8A:
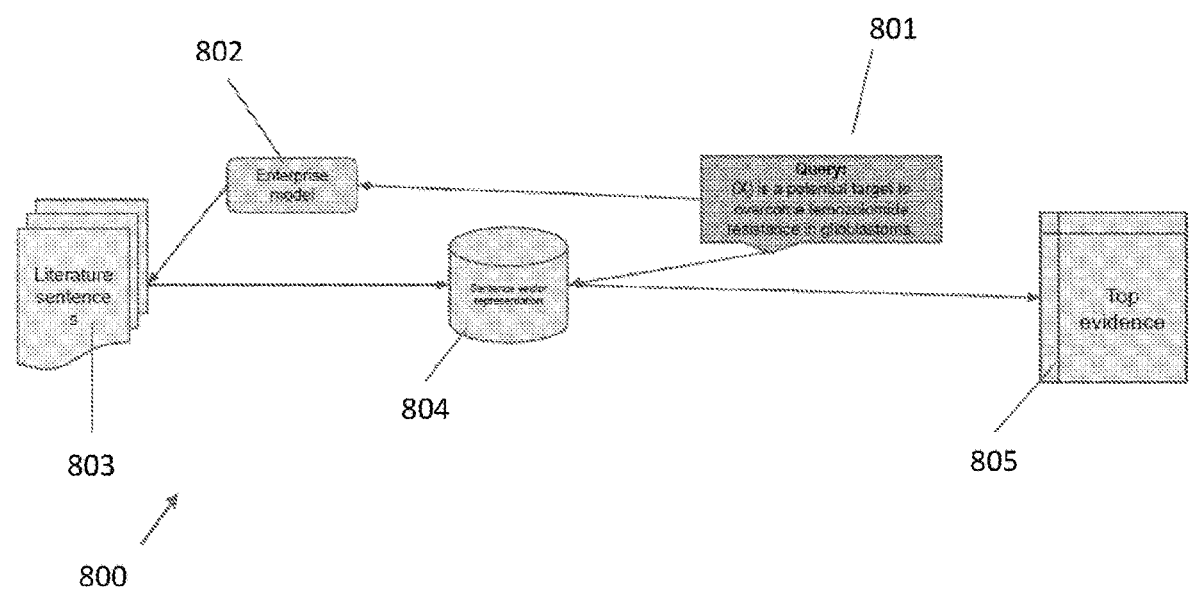
FIG. 8A illustrates a method of returning relevant portions of the training text providing evidence to support identified biological entities according to the present invention.

FIGS. 8a and 8b illustrate a further optional extension to the method according to the present invention. In particular, FIG. 8a illustrates a method of evidence surfacing, i.e. returning portions of the training corpus which are highly related to an input query and provide a user with specific evidence supporting a corresponding identified biological target (or other biological entities). In particular, these features allow applying the trained model to return portions of the training corpus that the model has identified as relevant to the query. These are not simply completions from the training data that have been memorised by the model, but portions of the text the model had learned, by its training over the full corpus, provide relevant context. They often will have no words in common so the method goes beyond simply text matching. These aspects of the method can be considered a computer implemented method of generating a search query to return highly contextually relevant portions of a training text associated together with a predicted biological entity.

As with all examples of the present invention the input query 801 used to generate a cloze-style text sequence defining biological context in which a biological entity, preferably a biological target, is masked. The query is input into the model 802 as described above to generate an output list of ranked biological targets. In addition, the query is passed to a sentence vector representation model 804 which generates a representation of the text sequence. The model 802 returns one or more sentences 803 from the training data which include mention of the associated predicted target. These sentences 803 are also passed to the sentence vector representation model 804 to generate a representation of the sentences 803 from the training data. The method preferably generates a representation of the sentences using the trained language model.

By comparing the representations of the input query and the sentences from the training data, an assessment of the relevance of the sentence to the input query is identified and those sentences from the training data having the highest relevance score are output with the predicted targets in the output 805 of the model. The relevance score may be calculated based on the cosine similarity between a representation of the input query and each of the returned sentences from the training corpus.

FIG. 8b illustrates an example user interface 810 according to the present invention. The user interface 810 comprises a text entry box 811 for a user to enter the input query in the form of a cloze-style statement defining a biological context for which a biological entity, in this case a biological target, is sought. In this example the user query is "[x] is a promising therapeutic target for atopic dermatitis". The user submit the query, which is then processed according to the method as described above, by preparing a input representation encoding the text sequence which is passed to the trained machine learning model. The output from the model comprises a list of ranked biological targets, ranked by a score assigned to each target by the model as to its relevance to replace the mask icon [x] in the input query. This output is displayed in the form of a results table 812 in the user interface 810.

A relevance score is calculated for each biological target assessed by the model. The relevance score may be based on the probability of the target filling the mask in the input query, as calculated by the model. For example the displayed relevance score may be a linear transform on the log probabilities of the target fitting into the sentence to scale it in the range [0,100]. The table may be also include a popularity metric providing an indication of how common mentions of the target were across the training corpus. The popularity metric may be calculated based on the proportion of sentences across the corpus that the target appears in, log-normalized to [0,100]. This provides an indication of how well documented the target is and may be taken into account in the process of selecting targets for progression through the validation pipeline, given that the relative novelty of the target may be one important criteria in assessing a target. Furthermore, the popularity score may be used to confirm that the model is not promoting the relevance of a target simply because it is more widely mentioned across the training corpus. To this end, the method may additionally comprise computing a corrected score, taking into account relevance and popularity. In the example of FIG. 8B the corrected score is simply the relevance score minus the popularity score and is displayed in the table.

FIG. 8b also illustrates the results of the method of evidence surfacing described above. An evidence table 813 may also be output and displayed in the user interface 810. In particular, the results table 812 may include an evidence column, allowing a user to select and display evidence determined using the method illustrated in FIG. 8a. In the example of FIG. 8b, a user has selected target NTRK1, ranked 122, for display in the evidence table 813. The evidence table displays a number, in this case 100, items of evidence associated with the corresponding biological entity, in this case the biological target NTRK1 In some examples the score may be adjusted according to a popularity metric.

This compensates for any bias in the model to predict entities that occur more frequently in the training corpus. The score may be adjusted based on a popularity metric, where the popularity metric is a measure of the proportion of sentences across the corpus that the target appears in. Using the method of FIG. 8a to compare the similarity of a representation of the input query and a representation of each evidence sentence (i.e. each text sequence of the training data) an evidence score is calculated, as displayed in column 2, "Score" in the evidence table 813. This may be based on the cosine similarity between the representations. In addition to the evidence sentence itself, the model may output metadata such as document ID or digital object identifier to allow the user to find and review the source of the evidence sentence. The evidence table 813 in this example displays the evidence text itself, together with the year of publication and a link to the relevant article of the training corpus. As clear from the table, some of these evidence sentences share no words in common with the input query so the method is not acting simply as a text or synonym matching method, but is returning relevant sentences based on biological context learned by the model, as encoded in the representations learned during training which are used to represent the sentences for comparison to return the evidence. This evidence surfacing technique assists a user in quickly validating biological targets for progression in the drug discovery pipeline.

Figure 9:
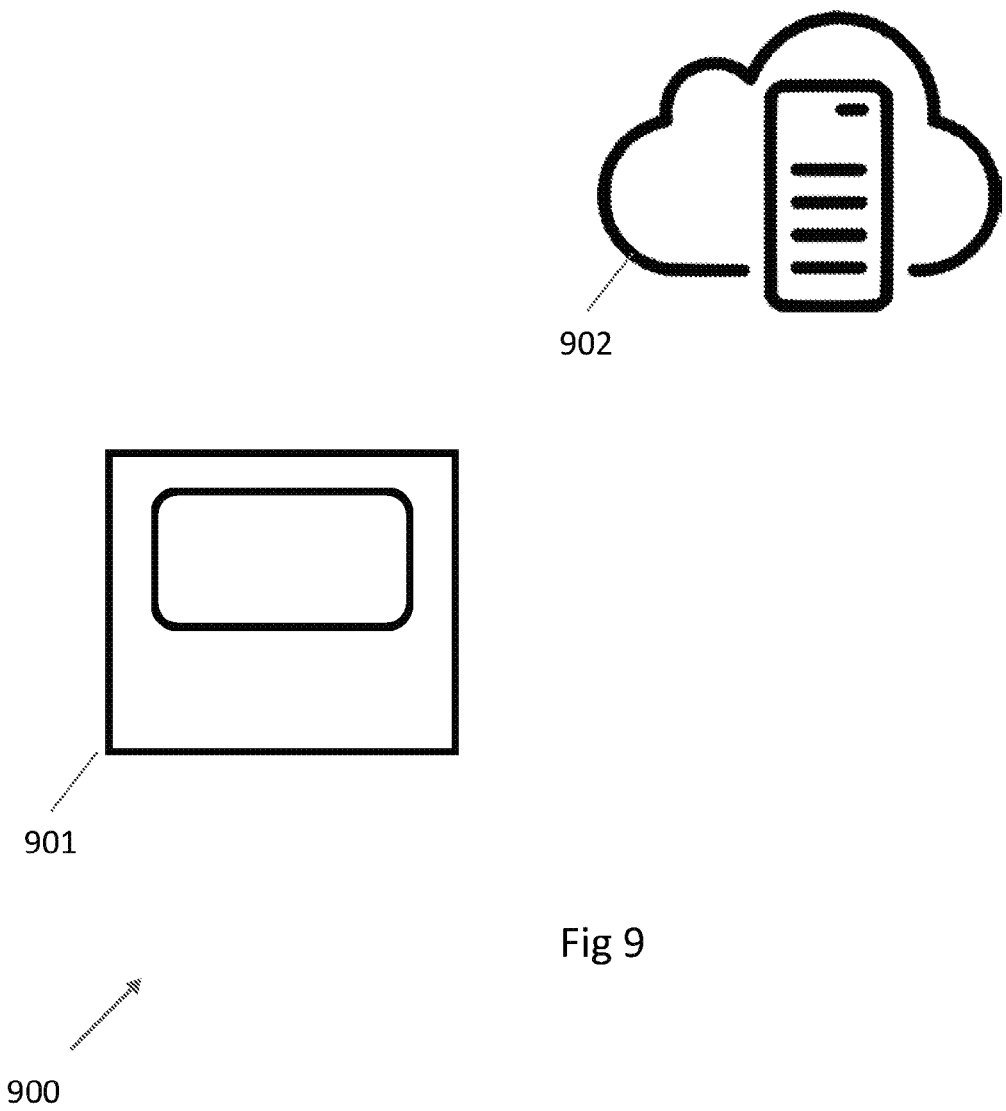
FIG. 9 illustrates a system for identifying biological entities for drug discovery according to the present invention.

FIG. 9 illustrates a system 900 suitable for implementing the computer implemented method according to the present invention. System 900 includes a processor 902 configured to perform the method as described above. In the example of FIG. 9 the system includes a user device 901 providing a user interface for a user to input a query defining a biological context for which a biological target is sought. The user query is processed according to the method as described above using processor 902. The processor 902 may be provided within the user device or locally connected to the user device. In this example, the processor 902 is provided remotely from the user device 901. The processor 902 may be distributed across a network of servers. The user device 901 may comprise a processor and input output device that communications portal and a computer memory. The memory may store code that, when executed by the processor, causes the device to perform the method as described in any appended claim or in the description above.

General Applicability of the Method

Although the present method is specifically configured to the task of predicting biological entities for the purpose of drug discovery, it may be adapted to the more general task of relationship or link prediction. The following section describes the adaption of the present method to general link prediction. The following features may be combined with the methods described above.

Many relational facts require context; for instance, a politician holds a given elected position only for a particular timespan. This context (the timespan) is typically ignored in knowledge graph (KG) link prediction tasks, but leveraged by models designed specifically to make use of it (i.e. n-ary link prediction models). Over the past decade, several models have been developed to learn from and infer on n-ary relationships. This development has been driven by the recognition that knowledge bases like Freebase (Bollacker et al., 2008) contain a sizeable number of relationships involving more than two named entities. Wen et al. (2016) generalized the triple-based translational embedding model TransH (Wang et al., 2014) to hyper relational facts. Zhang et al. (2018) extended this approach using a binary loss learned from the probability that any two entities participate in the same n-ary fact.

Unlike these earlier embedding-based models, NaLP (Guan et al., 2019) addressed the n-ary link prediction problem with a neural network, representing n-ary facts as permutation-invariant sets of role-value pairs. Liu et al. (2020) developed the first tensor decomposition-based approach to the problem, adapting earlier tensor decomposition methods applied to link prediction in triple-based KGs. HINGE (Rosso et al., 2020) applies a convolutional network to the underlying triples and qualifiers in an n-ary fact.

More recently, several specialised n-ary prediction models have been developed by combining KG embeddings with attention-based transformer decoders (Vaswani et al., 2017); namely STARE (Galkin et al., 2020), Hy-Transformer (Yu and Yang, 2021) and GRAN (Wang et al., 2021a). In the STARE model, embeddings are fed through a graph neural network before entering the transformer layer. Hy-Transformer and GRAN instead feed the processed embeddings into the transformer directly. Hy-Transformer also adds a qualifier prediction-based auxiliary task, while GRAN modifies the transformer attention model to represent the link structure of the n-ary input. Together, these three transformer-based models have achieved state-of-the-art performance on the n-ary link prediction task.

The present approach differs significantly from other n-ary link prediction models in that it represents facts in natural language, eliminating the need for specialised encoders or graph-based methods. By representing facts as token sequences, earlier modelling constraints can be avoided; e.g. multiple sentences arities can be supported with the same model (unlike Liu et al. (2020)), and structural information can be retained in token positional encodings, unlike Wen et al. (2016) and Guan et al. (2019).

The present approach differs from previous models by using a standard word-piece tokenisation approach (Vaswani et al., 2017) to efficiently parse the literal data (e.g. splitting the year 1706 into two tokens, 170 and ***6). In addition, in the tasks we consider here, literals are entities directly participating in n-ary facts rather than entity attributes; present approach can be straightforwardly applied to numerical attributes as well, by inserting them into the textual templates.

Notably, literal attributes composed of textual descriptions have also been investigated in KG completion, e.g. (Xie et al., 2016; Xu et al., 2016). While we focus on numerical literals using a natural language-based approach, our approach can also be extended to textual attributes.

The present general approach to link prediction uses a language model alongside a method for constructing cloze-style query sentences. Introduced herein is a pre-training methodology based around an (auxiliary) entity linked corpus that outperforms other popular pre-trained models like BERT, even with a smaller model. Present methodology also enables zero-shot n-ary link prediction without access to any n-ary training set, which will be invaluable in circumstances where expensive and time-consuming curation of n-ary KGs is not feasible. State-of-the-art performance on the primary n-ary link prediction dataset WD50K and SOTA performance on WikiPeople facts that include literals—typically ignored by KGE methods.

The present general approach comprises three stages: 1. Pre-training to predict the unique identifier of a masked entity in the sentences of an auxiliary entity linked corpus; 2. Fine-tuning on sentence-like natural language templates created from the training set of the n-ary link prediction dataset; 3. Evaluation on the test set of the n-ary link prediction dataset using the same format of natural language templates. Stages 2 and 3 may be integrated or combined. The first stage may be used independently without subsequent fine-tuning. The following sections describe an exemplary study in accordance with the present approach. The present approach shows improvement of any of the existing methods of link prediction.

During the Pre-training stage, for example, a pre-training dataset is constructed using regex to find occurrences of the entities of interest in the large entity linked corpus. Entity Linked Corpus may be any corpus that references the entities of interest and any entity linking methodology for recognising them within the corpus. Entity Linked Corpus does not need to be the gold standard. An example of the Entity Linked Corpus may be 2019 Aug. 1 Wikipedia dump used in BLINK (Ledell Wu, 2020) as our corpus. Article hyperlinks are left in the text; XMLs are processed with Gensim, an open-source Python library for representing text as semantic vectors. Since the entity linked corpuses are not required to be the gold standard, methods such as regex may be used to construct the dataset, making our approach significantly easier and more applicable. In the example of prediction of biological entities, the training corpus may be an entity linked biomedical corpus, as described above.

Entities of interest may be a set of entities associated with other one or more entities or serve as part of an input to a machine learning model of predicting one or more entities. As described above, each entity may represent a biological entity from the group of: from the disease, gene, protein, compound, chemical, drug, biological pathway, biological process, anatomical region or entity, tissue, cell-line, or cell type, clinical trials, any other biological or biomedical entity and the like. Each of the plurality of entities may have a relationship with another one or more entities of said one or more entities or itself.

For each article of the dataset, the title entity and all of the hyperlinked entities are taken and the wikidata IDs for each of these entities is found. This is accomplished with an entity linking process. Those that are in the downstream n-ary dataset are retained. The article is then split into sentences and a regex is run over each sentence to find the spans of any of these entities. Each pre-training example is a tuple consisting of a Wikidata ID and a masked sentence in which that entity occurs. In the sentence, the span of every occurrence, the entity of interest is replaced by a "[MASK]" token. The entity of interest may be a most probable entity. A single unique entity is masked in each example, while all other entities are left as plain text. For example, continuing with Stephen Hawking, the label is Q17714 and a masked sentence would be: "[MASK] (8 Jan. 1942-14 Mar. 2018) was an English theoretical physicist, cosmologist, and author." [For fine-tuning and evaluation, for example, two n-ary link prediction datasets are used: WD50K (Galkin et al., 2020) and WikiPeople (Guan et al., 2019). WD50K was created by Galkin et al. (2020) from the 2019 Aug. 1 Wikidata dump with the goal of containing a higher proportion of non-literal higher-order relationships. WD50K is based on the entities from FB15K-237 (Bordes et al., 2013) that have a direct mapping in Wikidata.

The WikiPeople dataset used was adapted by Rosso et al. (2020) from the original WikiPeople (Guan et al., 2019). Rosso et al. (2020) drop all statements that contain literals in the main triple. A new dataset was also generated from a subset of WikiPeople, referred to as WikiPeople Literal. Unlike in Guan et al. (2019) and Rosso et al. (2020), where literal qualifier terms are ignored when filtering the rankings for evaluation, filtering in WikiPeople Literal the literal terms are instead included. Additionally, evaluation is performed only on facts that include at least one literal, allowing the model's ability to interpret literal qualifiers to be probed.

[Both WD50K and WikiPeople are extracted from Wikidata and contain a mixture of binary and higher-order facts. WikiPeople is a commonly used benchmark containing facts related to entities representing humans. Galkin et al. (2020) noted that most of the qualifier values in WikiPeople are literals, in this case date-time instances. Literals appear in approximately 13% of the statements in the WikiPeople dataset, but they are typically ignored in KGE approaches (Rosso et al., 2020). If the literals are ignored, 2.6% of statements in WikiPeople are higher-order. None of the previous approaches to this dataset encodes literals. Alternative correct entities are filtered from the ranking at evaluation time when assessing a given potential answer. This has implications for literal filtering. For example, when evaluating whether the model correctly predicted Eddington-Medal as a completion for the fact (StephenHawking, AwardReceived,[MASK], (PointInTime, 1975)), the entity CopleyMedal would be filtered out of the ranking if the fact (StephenHawking, AwardReceived, CopleyMedal, (PointIn-Time, 2006)) also exists in the dataset. This occurs because the PointInTime qualifier is ignored, so that the subject and relation of the facts are identical (and both medals are equally valid completions). When literal-containing qualifiers are not ignored, the facts are distinct, with only one correct answer for each.

Figure 12:
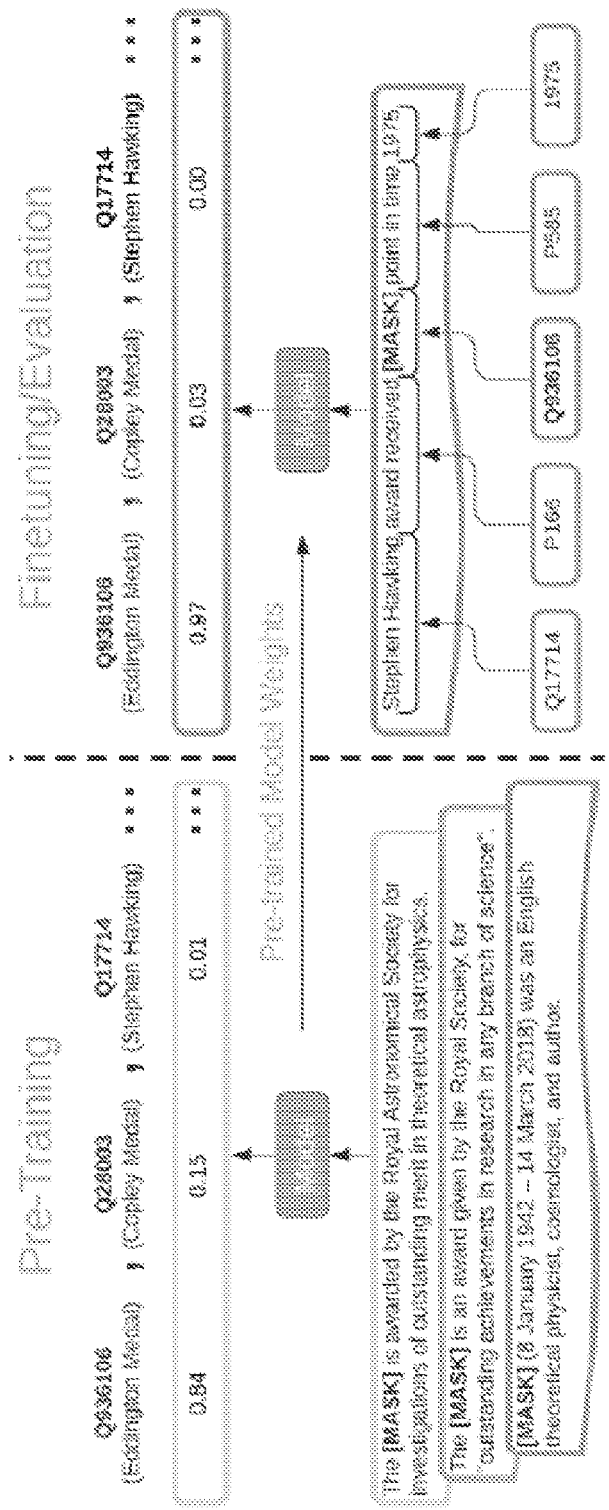
FIG. 12 is an example of a schematic diagram showing the generation of pre-training dataset subsequent to fine-tuning and evaluation steps.

For implementation, the query is formatted in natural language. The Wikidata names are utilised for each of the entities and relationship/role IDs. A template is then created based on hyper relational fact for each example by space separating the entities, relationships and roles in the (s, r, o, Q) order, with s, o $\in$V and r $\in$R; Q is the set of qualifier pairs (qri, qvi) with qualifier relations qri $\in$R and qualifier values qvi $\in$V. An example of a fact in this representation would be (StephenHawking (s), AwardReceived (r), EddingtonMedal (o), (PointInTime (qri), 1975 (qvi))). The template may be associated with a hyper relational (n-ary) graph can be defined as G=(V, R, E), where V is the set of vertices (entities), R is the set of relations, and E is a set (e1, ... , en) of edges with ej⊆V×R×V×P (R×P) for 1≤j≤n. Here, P denotes the power set. IN this process of fine-tuning and evaluation, it is found that while the queries are not particularly natural in their structure and vocabulary, their meaning remains largely the same. (an example template is shown in FIG. 12, under fine-tuning and evaluation)

Applicable models such as those based on the Transformer architecture (Vaswani et al., 2017) may be used to show the impact of the proposed pre-training methodology on the performance of the n-ary link prediction dataset. More specifically, the architecture proposed in BERT (Bidirectional Encoder Representation based on Transformers) (Devlin et al., 2019) may be used. However, a different size set of hyperparameters and initialisation perform better for the present task than the one presented in (Vaswani et al., 2017). These changes also allow for the model to be pre-trained over the entire entity linked corpus using only limited computational resources. Additionally, it has been determined that smaller versions are more stable and significantly faster in convergence. BERT base uncased wordpiece tokenisation is used for all text-based models. A single linear layer is used as a decoder, followed by a softmax. For optimisation, w standard categorical cross-entropy loss is leveraged. All models are trained with the Adam optimiser, and are regularised via dropout and gradient clipping. The same setup is followed during pre-training as well as fine-tuning. The alignment between pre-training alignment and the downstream task is part of what makes this approach so powerful. The pre-trained model can also be applied on the downstream task even without additional fine-tuning for the purpose of zero-shot inference.

Figure 10:
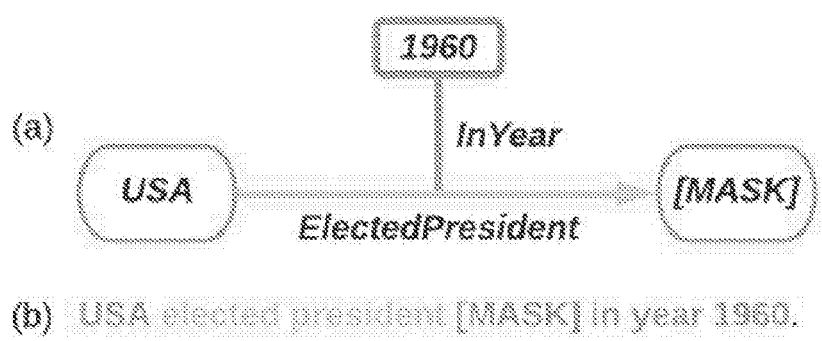
FIG. 10 is an example of a schematic diagram showing an example of an n-ary query in (a) knowledge graph representation and (b) natural language representation.

FIG. 10 is a schematic diagram showing an example of an n-ary query in KG representation and natural language representation. (a) is indicative of an exemplary KG representation in triple. In the representation, the primary triple query (USA, ElectedPresident, [MASK]) is augmented with an auxiliary link for qualifier information (InYear, 1960). Qualifiers require the use of specialised encoder architectures; literal qualifiers like 1960 typically cannot be used at all under this representation. In contrast, in natural language representation, the query in a templated masked language model, where the qualifier detail can be directly appended, has an advantage over the KG representation.

Figure 11:
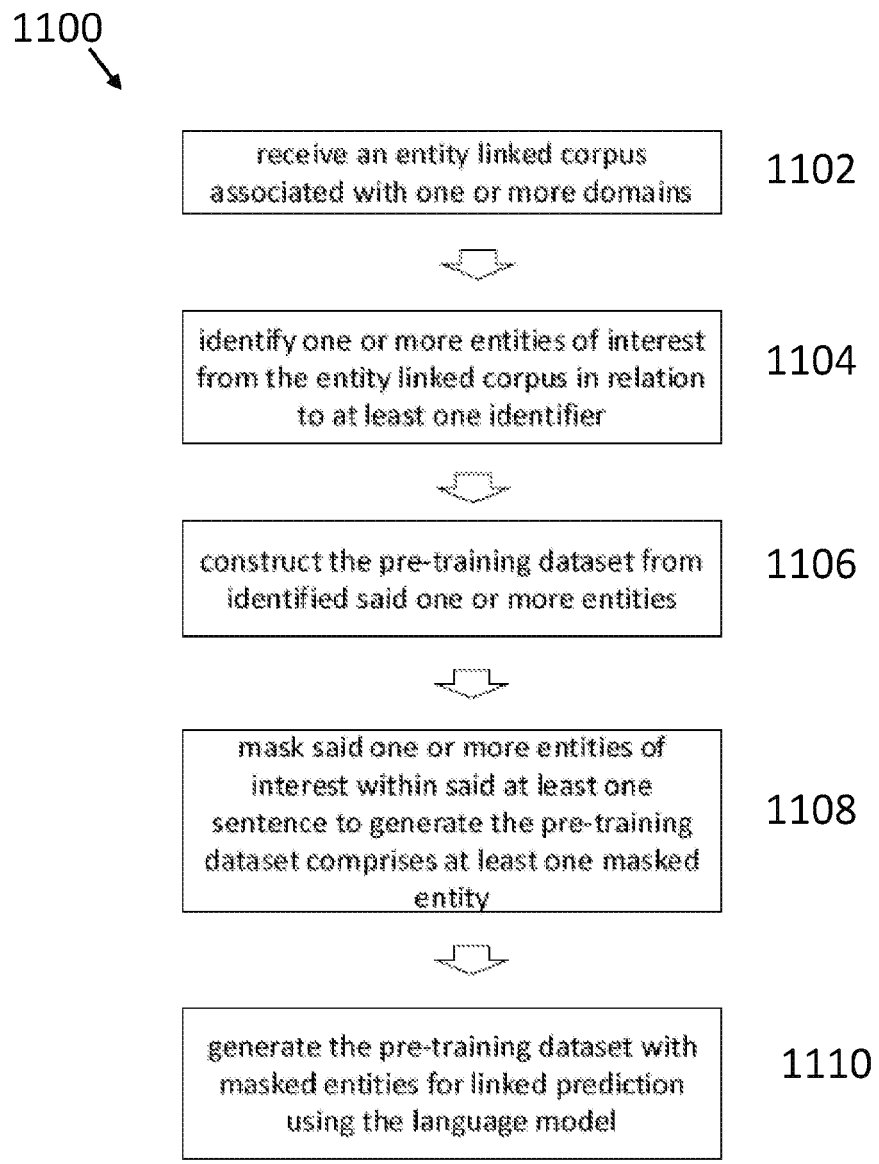
FIG. 11 is a flow diagram showing the steps of providing a pre-training dataset for link prediction using a language model.

FIG. 11 is a flow example showing an example of a method of providing a pre-training dataset for link prediction using a language model. The method comprises steps of receiving an entity linked corpus associated with one or more domains; identifying one or more entities of interest from the entity linked corpus in relation to at least one identifier; constructing the pre-training dataset from identified said one or more entities, wherein the pre-training dataset comprises at least one sentence with one or more entities of interest; masking said one or more entities of interest within said at least one sentence to generate the pre-training dataset comprises at least one masked entity and said at least one identifier; and generating the pre-training dataset with masked entities for linked prediction using the language model.

In step 1102, an entity linked corpus is received for preparing the pre-training dataset, where the entity linked corpus is associated with one or more domains described herein. The entity linked corpus may comprise a dataset corresponding to said one or more domains. For example, the domain(s) may include but are not limited to biological, biomedical, chem(o)informatics or bioinformatics knowledge domains.

In step 1104, one or more entities of interest may be identified from the entity linked corpus in relation to at least one identifier. Said at least one identifier may be a unique identifier associated with or of a masked entity in the sentences from the entity-linked corpus. The identifier may be exclusive for the entity linked corpus and differ contextually with respect to the entity linked corpus used.

In step 1106, a pre-training dataset from identified said one or more entities are being constructed. The pre-training dataset comprises at least one sentence with one or more entities of interest. The sentence may be in a cloze-style sentence format. The sentence may be a query during training and inference.

In step 1108, said one or more entities of interest are masked within said at least one sentence to generate the pre-training dataset comprises at least one masked entity, and optionally said at least one identifier. The masked entity may be designated by the word/token "MASK" or another term. The pre-training data set comprise various masked entities sentences split up from an article. The masked entity may be associated with said at least one identifier to which the constructed pre-training dataset is used to predict.

In step 1110, the pre-training dataset with masked entities is generated or provided for by the method. The pre-training dataset may be used for linked prediction using a language model in the context of identifying linkages between the target gene and one or more diseases.

As another option, the template comprises a set of qualifier pairs with qualifier relations and qualifier values; the template further comprises at least one entity, relationship, and role associated with the hyper-relational graph. The template may be a tuple.

The pre-training dataset is used for training a machine-learning model described herein. The trained machine learning model may be used for n-ary link prediction, where the machine learning model is configured to: encode the pre-training dataset comprises at least one query and answer pair with respect said at least on an identifier associated with the pre-training dataset; generate at least one vector representation from the pre-training dataset; update the machine-learning parameters of the model based on said at least one vector representation; and output a trained machine-learning model with the parameters updated in accordance with the pre-training dataset.

As an option, the trained machine-learning model is used to predict the relationship between a target gene and one or more entities associated with the target gene based on a query of the target gene. As another option, said one or more entities comprise at least one gene, mechanism, disease, protein in relation to a query in natural language.

During link prediction, a query to a machine-learning model for link prediction may be used and received as input; and applying the machine learning model to the query to generate an answer, where the machine learning model is configured to: encode the query to generate a vector representation; and decode vector representation to generate the answer for the query.

As an option, the query is posed in a natural language sentence that comprises at least one entity of interest masked in the query. As another option, the answer comprises a set of entities in relation to a target protein or gene.

In a further option, a ranking of the entities are provided, where the ranking is determined based on providing a score for each entity of the set based on a predicted probability associated with said each entity, wherein the score is indicative of the predicted probability that an entity of the set is an entity of interest or a most probable entity; and ranking the set of entities based on the score.

FIG. 12 is a schematic diagram showing an example of the pre-training stage. The pre-training stage is followed optionally by fine-tuning and evaluation stage. The pre-trained model weights are carried forth during the optional fine-tuning and evaluation for predicting the unique identifier of a masked entity in the sentences of an entity-linked corpus. Any suitable language model may be used with the pre-trained dataset or following fine-tuning using the template. In order to use the language model to predict an identifier based on a masked entity in the sentence, a pre-training dataset tends to be constructed and used during prior to training.

The language model may be a machine learning model, predictive algorithms and/or techniques may be used to generate a trained model such as, without limitation, for example, a classifier based on input data referred to as training or annotated data associated with one or more sentences in cloze-style query format. Said one or more sentences may be provided in relation to an entity-linked corpus. The machine-learning model is configured for link prediction receiving natural language inputs.

In relation to the language model used herein, some examples of machine learning techniques underlying the language model may include or be based on, by way of example only but are not limited to, one or more of active learning, multitask learning, transfer learning, neural message parsing, one-shot learning, dimensionality reduction, decision tree learning, association rule learning, similarity learning, data mining algorithms/methods, artificial neural networks (NNs), encoder/decoder structures, deep NNs, deep learning, deep learning ANNs, inductive logic programming, support vector machines (SVMs), sparse dictionary learning, clustering, Bayesian networks, types of reinforcement learning, representation learning, similarity and metric learning, sparse dictionary learning, genetic algorithms, rule-based machine learning, learning classifier systems, and/or one or more combinations thereof and the like.

For use with the language model, the entity linked corpus may be associated with one or more domains related to chem(o)informatics and bioinformatics, techniques can be used to generate further trained ML models, classifiers, and/or analytical models for use in downstream processes such as, by way of example but not limited to, drug discovery, identification, and optimisation and other related biomedical products, treatment, analysis and/or modelling in the informatics, chem(o)informatics and/or bioinformatics fields.

Although details of the present disclosure may be described, by way of example only but are not limited to, with respect to biological, chem(o)informatics or bioinformatics entities, and the like it is to be appreciated by the skilled person that the details of the present disclosure are applicable as the application demands to any other type of entity as per the exemplary entity-linked corpus used for experimenting with present invention discussed herein.

In the embodiments, examples, and aspects of the invention as described above such as process(es), method(s), system(s) may be implemented on and/or comprise one or more cloud platforms, one or more server(s) or computing system(s) or device(s). A server may comprise a single server or network of servers, the cloud platform may include a plurality of servers or network of servers. In some examples the functionality of the server and/or cloud platform may be provided by a network of servers distributed across a geographical area, such as a worldwide distributed network of servers, and a user may be connected to an appropriate one of the network of servers based upon a user location and the like.

The above description discusses embodiments of the invention with reference to a single user for clarity. It will be understood that in practice the system may be shared by a plurality of users, and possibly by a very large number of users simultaneously.

The embodiments described above may be configured to be semi-automatic and/or are configured to be fully automatic. In some examples a user or operator of the querying system(s)/process(es)/method(s) may manually instruct some steps of the process(es)/method(es) to be carried out.

Various functions described herein can be implemented in hardware, software, or any combination thereof. If implemented in software, the functions can be stored on or transmitted over as one or more instructions or code on a computer-readable medium or non-transitory computer-readable medium. Computer-readable media may include, for example, computer-readable storage media. Computer-readable storage media may include volatile or non-volatile, removable or non-removable media implemented in any method or technology for storage of information such as computer-readable instructions, data structures, program modules or other data. A computer-readable storage media can be any available storage media that may be accessed by a computer.

Although illustrated as a single system, it is to be understood that the computing device of FIG. 9 may be a distributed system. Thus, for instance, several devices may be in communication by way of a network connection and may collectively perform tasks described as being performed by the computing device. Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, IoT devices, mobile telephones, personal digital assistants and many other devices.

The invention claimed is:

1. A computer-implemented method of training a machine learning model to identify biological entities for drug discovery, the method comprising:

providing a training data set comprising a plurality of entity-linked text sequences, each text sequence including a mention of a biological entity, where the biological entity is linked to a corresponding biological entity identifier from a set of possible biological entity identifiers;

masking the mention of the biological entity within each text sequence;

encoding each masked text sequence into an input representation for a machine learning model; and training a machine learning model to predict the biological entity identifier of the masked biological entity based on the input representation.

2. The computer-implemented method of claim 1 wherein the biological entity that is masked in each text sequence comprises a biological target, where the biological target is linked to a biological target entity identifier and the machine learning model is trained to predict the biological target entity identifier.

3. The computer-implemented method of claim 1 wherein the step of providing a training data set comprises:

providing an entity-linked biomedical text corpus, where mentions of biological entities within the biomedical text corpus have been linked to a biological entity identifier from a set of possible biological entity identifiers; and selecting text sequences including a mention of an entity-linked biological entity from the entity-linked biomedical text corpus.

4. The computer-implemented method of claim 1 wherein the step of providing a training data set comprises generating a text sequence by converting a structured non-text data source into text data.

5. The computer-implemented method of claim 4 wherein the structured non-text data source comprises one of:

patient-level omics data, genetics data, sequencing data; or knowledge graph data.

6. The computer-implemented method of claim 4 wherein the method comprises training the machine learning model using both text sequences extracted from a biomedical text corpus and text sequences generated from a non-text data source.

7. The computer-implemented method of claim 1 wherein one or more text sequences comprises a mention of a biological target, a mention of a disease and a mention of one or more of: a biological mechanism involving the biological target, a biological tissue, and/or a cell type.

8. The computer-implemented method of claim 1 wherein the machine learning model comprises:

an encoder for mapping the input representation to an output representation; and a classifier layer that receives the output representation and performs classification into classes corresponding to the set of possible biological entity identifiers.

9. The computer-implemented method of claim 1 wherein the machine learning model is trained to output a probability distribution over the set of possible biological entity identifiers.

10. The computer-implemented method of claim 1 wherein, in addition to the mention of a biological entity to be masked, each entity-linked text sequence comprises one or more additional entity-linked biological entities; wherein the method comprises:

querying a knowledge graph to extract a subgraph containing one or more of the additional entity-linked biological entities, wherein the extracted subgraph comprises the one or more additional entity-linked biological entities of the text sequence and, for each of the additional entities, one or more neighbouring entities within the knowledge graph;

encoding the masked text sequence and the subgraph together into a combined representation; and training a machine learning model to predict the biological entity identifier of the biological entity to be masked based on the combined representation.

11. The computer-implemented method of claim 10 wherein encoding the masked text sequence and the subgraph together into a combined representation comprises:

encoding the masked text sequence into the input representation;

encoding the subgraph into a graph embedding; and combining the input representation and graph embedding into the combined representation, wherein combining the input representation and graph embedding into the combined representation comprises:

performing cross-attention on the input representation and the graph embedding to form the combined representation.

12. A computer-implemented method of identifying biological entities for drug discovery using a trained machine learning model, the method comprising:

receiving a user query defining a biological context for which a biological entity is to be determined;

obtaining, based on the query, a natural language text sequence describing the biological context, including mention of a biological entity, in which the biological entity itself is masked for prediction by the machine learning model;

encoding the text sequence into an input representation for a machine learning model;

inputting the input representation into a trained machine learning model, together with a set of unique biological entity identifiers, each associated with a candidate biological entity; where the machine learning model is trained to predict, for each of the set of unique entity identifiers, a probability that the associated biological entity completes the text sequence by replacing the masked biological entity; and outputting one or more biological entities from the set of candidate biological entities based on their predicted probabilities.

13. The computer-implemented method of claim 12 wherein the biological entity to be determined is a biological target and the method comprises obtaining a natural language text sequence describing the biological context, including a mention of a biological target, in which the biological target itself is masked, wherein the biological context comprises a disease of interest and one or more of a biological mechanism, a cell type, or a tissue type.

14. The computer-implemented method of claim 12 wherein the biological entity to be determined is a biological target, where the biological target comprises a gene or protein, and the trained machine learning model is trained to output a probability distribution over a human genome or a subsection of the human genome.

15. The computer-implemented method of claim 12 wherein the user query comprises the natural language text sequence describing the biological context, where the natural language text sequence is received via a user interface wherein the natural language text sequence comprises a cloze-style statement.

16. The computer-implemented method of claim 12 wherein training the machine learning model comprises:
provide a training data set comprising a plurality of entity-linked text sequences, each text sequence including a mention of a biological entity, where the biological entity is linked to a corresponding biological entity identifier from a set of possible biological entity identifiers;
masking the mention of the biological entity within each text sequence; and
encoding each masked text sequence into an input representation for a machine learning model, wherein the machine learning model is trained to predict the biological entity identifier of the masked biological entity based on the input representation.

17. The computer-implemented method of claim 13 wherein the user query comprises completion of a plurality of input fields, the plurality of input fields comprising the disease of interest and one or more biological entities or relationships, wherein obtaining a natural language text sequence comprises:
generating a plurality of different natural language text sequences, each including a masked biological entity and one or more additional biological entities based on the completed input fields; the method further comprising:
encoding each of the text sequences into an input representation for a machine learning model;
inputting each input representation into the trained machine learning model to obtain probabilities for a plurality of biological entities for each input representation; and
outputting a list of biological entities based on their combined probabilities across the plurality of input representations to identify one or more most promising biological entities across the different text sequences.

18. The computer-implemented method of claim 12 wherein the machine learning model is trained using a biomedical text corpus, the method further comprising:
for each output biological entity, outputting one or more semantically relevant sentences from the biomedical text corpus wherein:
the one or more semantically relevant sentences are sentences mentioning the corresponding output biological entity; and
the relevance of each of the one or more semantically relevant sentences is scored using a cosine similarity between a representation of the input text sequence and a representation of each sentence within the biomedical text corpus.

19. The computer-implemented method of claim 2 further comprising outputting metadata associated with each semantically relevant sentence, where the metadata comprises a document ID and/or digital object identifier.

* * * * *